(12) United States Patent
Novak

(10) Patent No.: US 6,865,555 B2
(45) Date of Patent: Mar. 8, 2005

(54) SYSTEM AND METHOD FOR PROVIDING CONDITIONAL ACCESS TO DIGITAL CONTENT

(75) Inventor: Robert E. Novak, Santa Clara, CA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/990,098

(22) Filed: Nov. 21, 2001

(65) Prior Publication Data

US 2003/0097655 A1 May 22, 2003

(Under 37 CFR 1.47)

(51) Int. Cl.⁷ .............................................. G06F 17/00
(52) U.S. Cl. ..................................................... 705/59
(58) Field of Search ............................. 705/26, 50, 54, 705/64, 59, 57, 58; 380/200–204; 713/200–202

(56) References Cited

U.S. PATENT DOCUMENTS

| | | | | |
|---|---|---|---|---|
| 4,200,770 A | * | 4/1980 | Hellman et al. ............... | 380/30 |
| 4,757,534 A | * | 7/1988 | Matyas et al. ................. | 705/56 |
| 5,365,589 A | | 11/1994 | Gutowitz ...................... | 380/43 |
| 5,629,980 A | | 5/1997 | Stefik et al. .................... | 380/4 |
| 6,209,103 B1 | | 3/2001 | Schreiber et al. ........... | 713/201 |
| 6,236,971 B1 | | 5/2001 | Stefik et al. ..................... | 705/1 |
| 6,367,019 B1 | * | 4/2002 | Ansell et al. ................ | 713/201 |
| 6,398,245 B1 | * | 6/2002 | Gruse et al. ................. | 380/228 |
| 6,587,837 B1 | * | 7/2003 | Spagna et al. ................ | 705/26 |
| 2001/0011238 A1 | | 8/2001 | Eberhard et al. ............. | 705/27 |

FOREIGN PATENT DOCUMENTS

EP  001146714 A1 * 10/2001

* cited by examiner

*Primary Examiner*—Pierre E. Elisca
(74) *Attorney, Agent, or Firm*—Kory D. Christensen; Stoel Rives LLP

(57) ABSTRACT

In response to a user request to view specific digital content, the user's set top box (STB) accesses a verification entity via a persistent network connection. The STB establishes the user's identity with the verification entity, for instance, by reading identity credentials from a smart card. In response to the verification entity having stored a license for the user to view the digital content, the STB receives a license key from the verification entity. In addition, the STB receives an encrypted access key from an access key source corresponding to a segment of encrypted digital content. The license key is used to decrypt the encrypted access key, which is, in turn, used to decrypt the segment of encrypted digital content. A user may transfer his or her license in whole or in part to another user by sending a transfer request to the verification entity.

76 Claims, 11 Drawing Sheets

SYSTEM AND METHOD FOR PROVIDING CONDITIONAL ACCESS TO DIGITAL CONTENT

BACKGROUND

1. Field of the Invention

The present invention relates generally to the field of entertainment systems. More specifically, the present invention relates to a system and method for providing conditional access to digital content.

2. Description of Related Background Art

Distribution of entertainment programs, including music, movies, and television, is now witnessing a gradual transition from analog to digital. However, because digital content may be copied with perfect accuracy, content producers, such as movie studios and television networks, are reluctant to release digital versions of their products without assurances that the products will not be copied without authorization. Legal assurances, such as the Digital Millennium Copyright Act (DMCA), as well as technological assurances, such as encryption, are now being tested, but have not been completely successful in allaying the fears of content producers.

Digital content is typically distributed in one of two formats: a physical media format, e.g., compact discs (CDs) or digital versatile disks (DVDs), and a broadcast or streaming format, e.g., digital cable, direct broadcast satellite (DBS), or video-on-demand (VoD).

Distribution via physical media presents a number of disadvantages. For example, while a user may place an online order for a DVD, he or she must typically wait several days for the DVD to be delivered. Moreover, where the user owns a large number of CDs or DVDs, transporting all of the media at once can be inconvenient.

In addition, neither CDs nor DVDs provide effective protection against piracy. For instance, standard CDs are not encrypted, and the encryption system for DVDs (i.e. CSS) was recently compromised, allowing pirates to freely decrypt and copy DVD content.

Distribution via broadcast or streaming media also presents a number of disadvantages. For instance, when a user purchases a license to view digital content, that license is generally associated with the user's home receiving equipment, e.g., a set top box (STB). Thus, the user may not watch a purchased movie or television show at a friend's house. Often, the purchase must be completed by telephone, which may be inconvenient and time-consuming, as well as prone to dialing errors.

Conventionally, licensing models for conditional access are limited to a one-time viewing model, as with pay-per-view (PPV), or an unlimited viewing model, as with a DVD or CD. Other licensing models are difficult or impossible with current technology.

Accordingly, what is needed is a system and method for providing conditional access to digital content that does not limit a user to watching purchased content on a single viewing device. What is also needed is a system and method that permits more sophisticated content licensing models than a one time or unlimited-viewing model. Additionally, what is needed is a system and method for providing conditional access to digital content that associates a license to view the content with a particular user, and allows that user to convey at least a portion of his or her license to another user. Indeed, what is needed is a digital content distribution system and method that approximates the loaning or selling of a physical article, such as a book, CD, or DVD.

BRIEF DESCRIPTION OF THE DRAWINGS

Non-limiting and non-exhaustive embodiments of the invention are described with reference to the figures, in which.

DETAILED DESCRIPTION OF THE PREFERRED EMBODIMENTS

Figure 1:
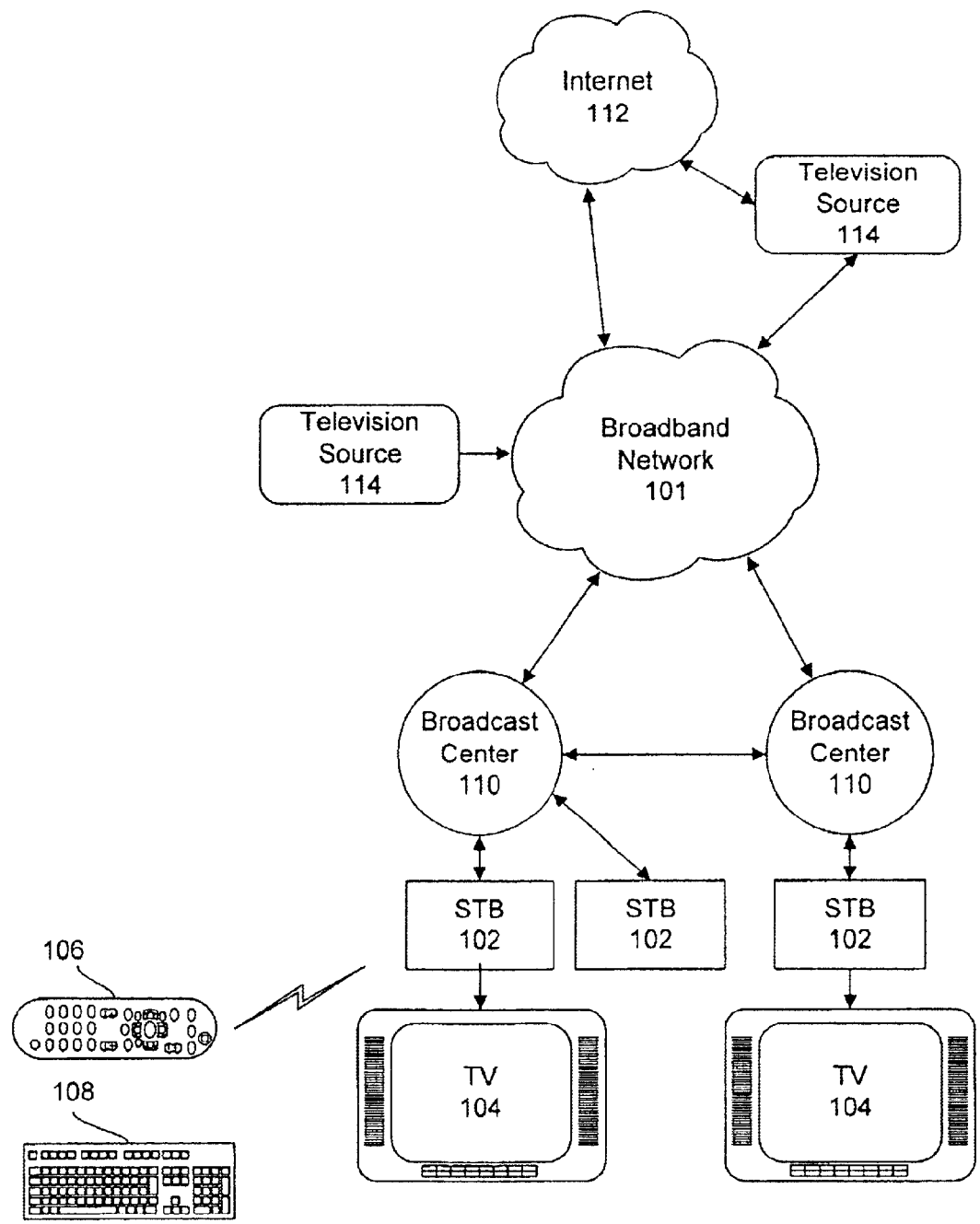
FIG. 1 is a block diagram of a communication system.

The present invention relates to a system and method for providing conditional access to digital content that addresses all of the above-identified problems and disadvantages.

In one implementation, an entertainment device, such as an Interactive Television (ITV) system, sends a user request to view specific digital content to a verification entity. The request may be sent via a persistent network connection, although a temporary network connection may be used in an alternative implementation. The request may be embodied in any suitable format according to the devices and/or software being used.

The user's identity is then established with the verification entity. In one configuration, the entertainment device reads identity credentials for a user from a smart card or the like and transmits them to the verification entity. The identity credentials may include, for example, a digital certificate, a digital signature, a pass code, a pass phrase, biometric data or the like, The verification entity confirms, based on the identity credentials, that the user is authentic using conventional authentication techniques.

Once the user's identity is established, the verification entity searches stored licenses for a license for the particular user to the view (or listen to) the requested content. The stored licenses may include a license key as well as a variety of other information which defines the rights and restrictions associated with the license. In one embodiment, the license is only a license key.

If a license is found, the verification entity checks the license to ensure that the license has not expired, been revoked, or been exhausted based on a time limit, set number of viewings, or other criteria. In one configuration, the verification entity may also determine whether the digital content is already being viewed at the user's request on a different entertainment device in order to prevent concurrent use of the license on multiple systems.

If the license has not expired or been exhausted, a copy of the license associated with the user is sent to the entertainment device from which the request was sent. Preferably, the license is delivered via a secure communication channel between the verification entity and the entertainment device, i.e. the license is, itself, encrypted to prevent unauthorized reception of or tampering with the license.

In one configuration, the received license is stored in volatile memory of the entertainment device. Access to the volatile memory may be limited to trusted modules and/or may be physically tamper-proof. In certain embodiments, the license may be stored temporarily, only long enough for the digital content to be viewed or played back.

The entertainment device also receives an access key from an access key source. As described more fully below, the access key may be used to decrypt all or part of the requested digital content. As received, the access key may be encrypted so that it may only be decrypted using a license key associated with the license received from the verification entity.

Alternatively, the entertainment device may receive an access key stream from the access key source. The access key stream includes a plurality of access keys for decrypting different segments of the requested digital content, and may likewise be decrypted only by the license. The key stream may be received all at once, or may be received via the network connection as needed during playback of the digital content.

In various embodiments, the access key source may be associated with or identical to the verification entity. Alternatively, the access key source may be a separate entity and may likewise be accessed via the persistent network connection (e.g., a parallel request may be sent to the access key source).

In certain embodiments, the access key source may be a piece of physical media on which the digital content is delivered. In such an embodiment, the access key or key stream may be stored on the same physical media as the digital content.

Before the digital content may be decrypted, the access key or key stream is decrypted using the license received from the verification entity. Thereafter, the decrypted access key or key stream may be stored within a secure volatile memory of the entertainment device. In certain configurations, once the access key or key stream is decrypted the license may be deleted from volatile memory. Alternatively, access to the license may be blocked until validity of the license can be verified with a verification entity. The access key or key stream may be deleted once the digital content has been decrypted.

Next, the entertainment device receives one or more segments of digital content from a content source. In certain configurations, digital content is received via broadcast or streaming sources, e.g., digital cable, DSS, VoD, etc. Alternatively, the digital content may be read from physical media, such as a DVD, CD, or the like.

The one or more segments of encrypted digital content are then decrypted using the decrypted access key or key stream. The decrypted segment or segments are then sent to an output device, such as a television, for viewing or playback.

In one implementation, the user may send a request to the verification entity to transfer at least a portion of the user's license to another user. The request may be sent from the entertainment device. Alternatively, the verification entity may be accessed by a personal computer or other terminal. Of course, the user's identity is verified in connection with the request as previously described.

In one configuration, the request may be to transfer the entire license to another user. In this case, the license may be updated within the verification entity substituting a second user for the first user. Alternatively, or in addition, a license for the first user may be revoked and a new license issued for the other user.

Alternatively, the request may be to transfer a portion of the license to the second user. For example, a first user may give or sell a sublicense to a second user to view the digital content. The sublicense may be a subset of the time period allocated to the first user, a subset of the number of viewings allocated to the first user, or the like. The sublicense to the second user may also be stored by the verification entity such that it may be located when the second user desires to view the content.

In certain embodiments, licenses and sublicenses may be organized into a hierarchy of licenses. Within the hierarchy each license or sublicense may have different restrictions on the number of descendent licenses allowed and/or the number of licenses allowed for a certain level, or generation of licenses. In addition, the validity of licenses within the hierarchy may change temporarily or permanently based on rights or limitations invoked with respect to other licenses in the hierarchy. In one configuration, a license may be disabled for a set period of time corresponding to an established time interval for a sublicense created from the license.

Throughout the following specification, the term license may be used to refer to a bundle of information defining a user's rights and constraints on those rights. Therefore, a license may refer to a license key and any number of limitations, terms, conditions, rights, and restrictions associating the user to the digital content. Furthermore, a license may be solely a license key and nothing more. Accordingly, the license may refer to a single information element such as a license key or any number of information elements used to define a particular license.

In addition, throughout this specification, the verification entity, access key source, content source, and entertainment device are described as separate and distinct entities, modules, or components. However, those of skill in the art recognize that these entities may be combined in various ways within the scope of the invention. For example, the key source may be embodied as a subsystem or component of the verification entity.

Furthermore, where a single access key and license key may be discussed herein, a plurality or "stream" of keys is also contemplated within the scope of the invention. Likewise, where a key stream is described, a single key may be used in alternative embodiments.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, there is shown a communication system 100. In one implementation, the system 100 includes a broadband network 101, such as a cable television network or a direct satellite broadcast (DBS) network, although other networks are possible.

The system 100 may include a plurality of set top boxes (STBs) 102 located, for instance, at customer homes or offices. Generally, an STB 102 is a consumer electronics device that serves as a gateway between a customer's television 104 and the network 101. In alternative configurations, an STB 102 may be embodied more generally as a personal computer (PC), an advanced television 104 with STB functionality, or another type of client terminal.

An STB 102 receives encoded television signals and other information from the network 101 and decodes the same for display on the television 104 or other display device, such as a computer monitor. As its name implies, an STB 102 is typically located on top of, or in close proximity to, the television 104.

Each STB 102 may be distinguished from other network components by a unique identifier, number, code, or address, examples of which include an Internet Protocol (IP) address (e.g., an IPv6 address), a Media Access Control (MAC) address, or the like. Thus, video signals and other information may be transmitted from the network 101 to a specific STB 102 by specifying the corresponding address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as wired or wireless mice (not shown).

Additionally, a keyboard 108 (either wireless or wired) is provided, in one embodiment, to allow a user to rapidly enter text information into the STB 102. Such text information may be used for e-mail, instant messaging (e.g. text-based chat), or the like. In various embodiments, the keyboard 108 may use infrared (IR), radio frequency (RF), or other wireless technologies to transmit keystroke data to the STB 102.

Each STB 102 may be coupled to the network 101 via a broadcast center 110. In the context of a cable television network, a broadcast center 110 may be embodied as a "head-end", which is generally a centrally-located facility within a community where television programming is received from a local cable TV satellite downlink or other source and packaged together for transmission to customer homes. In one configuration, a head-end also functions as a Central Office (CO) in the telecommunication industry, routing video signals and other data to and from the various STBs 102 serviced thereby.

A broadcast center 110 may also be embodied as a satellite broadcast center within a direct broadcast satellite (DBS) system. A DBS system may utilize a small 18-inch satellite dish, which is an antenna for receiving a satellite broadcast signal. Each STB 102 may be integrated with a digital integrated receiver/decoder (IRD), which separates each channel, and decompresses and translates the digital signal from the satellite dish to be displayed by the television 104.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 110 may be used to gather programming content, ensure its digital quality, and uplink the signal to the satellites. Programming may be received by the broadcast centers 110 from content providers (CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some broadcast programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

A broadcast center 110 may receive television programming for distribution to the STBs 102 from one or more television programming sources 114 coupled to the network 101. Preferably, television programs are distributed in an encoded format, such as MPEG (Moving Picture Experts Group). MPEG is a form of predictive coding. In predictive coding, how and how much a next image changes from a previous one is calculated, and codes are transmitted indicating the difference between images rather than the image itself. In MPEG, the images or frames in a sequence are typically classified into three types: I frames, P frames, and B frames. An I frame or intrapicture is an image that is coded without reference to any other images. A P frame or predicted picture is an image that is coded relative to one other image. A B frame or bi-directional picture is an image that is derived from two other images, one before and one after.

Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, H.263, H.263++ and H.26L. Accordingly, the invention should not be construed as being limited only to MPEG.

Broadcast centers 110 may be used to enable audio and video communications between STBs 102. Transmission between broadcast centers 110 may occur (i) via a direct peer-to-peer connection between broadcast centers 110, (ii) upstream from a first broadcast center 110 to the network 101 and then downstream to a second broadcast center 110, or (iii) via the Internet 112. For instance, a first STB 102 may send a video transmission upstream to a first broadcast center 110, then to a second broadcast center 110, and finally downstream to a second STB 102.

Of course, the communication system 100 illustrated in FIG. 1 is merely exemplary, and other types of devices and networks may be used within the scope of the invention.

Figure 2:
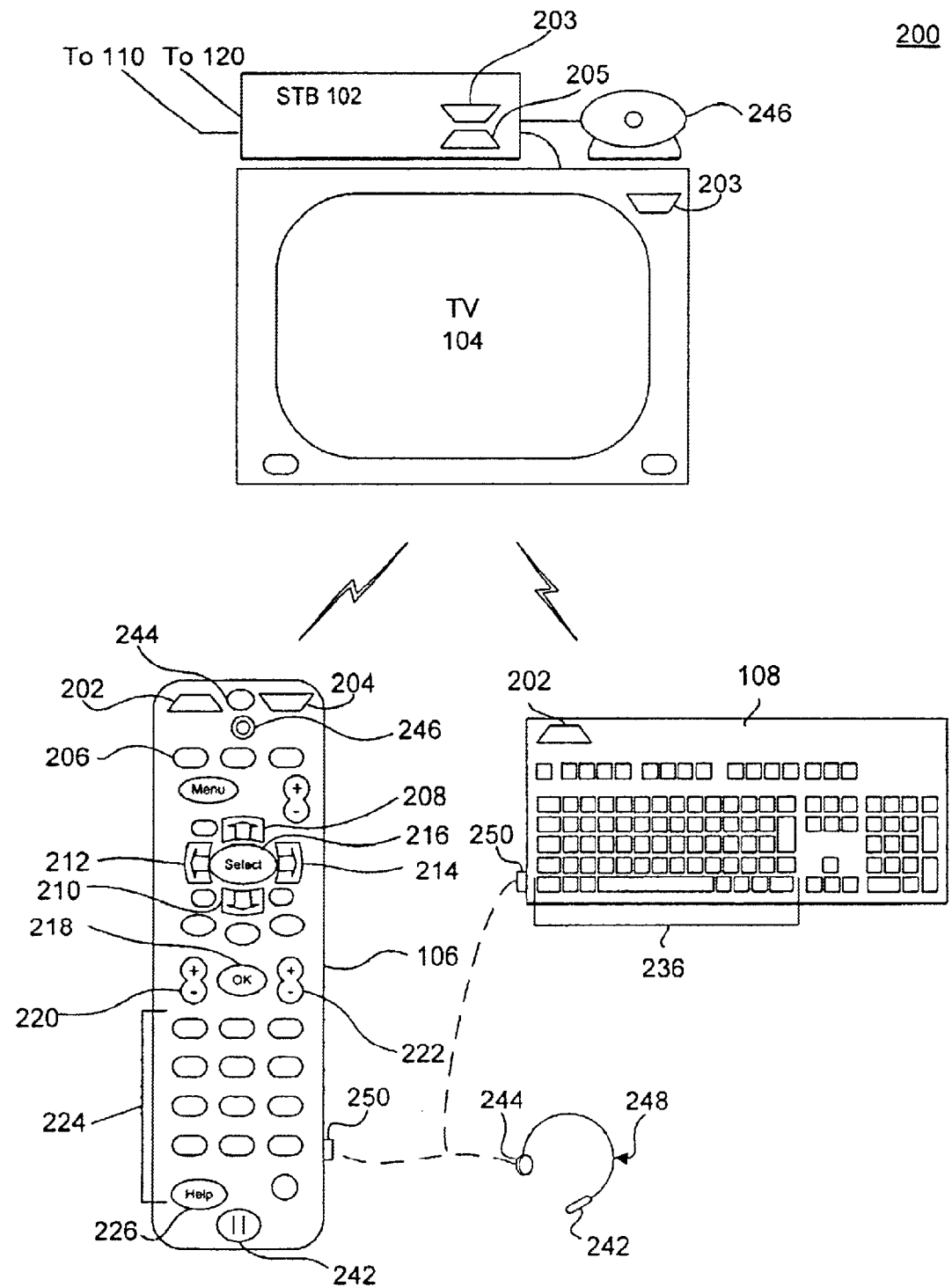
FIG. 2 is an illustration of an interactive television (ITV) system.

Referring now to FIG. 2, there is shown an interactive television (ITV) system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting control signals (and possibly audio/video data) to a wireless receiver 203 within the STB 102 and/or the television 104. In certain embodiments, the remote control 106 also includes a wireless receiver 204 for receiving signals from a wireless transmitter 205 within the STB 102. Operational details regarding the wireless transmitters 202, 205 and wireless receivers 203, 204 are generally well known to those of skill in the art.

The remote control 106 preferably includes a number of buttons or other similar controls. For instance, the remote control 106 may include a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, a "Help" button 226, and the like.

Figure 3:
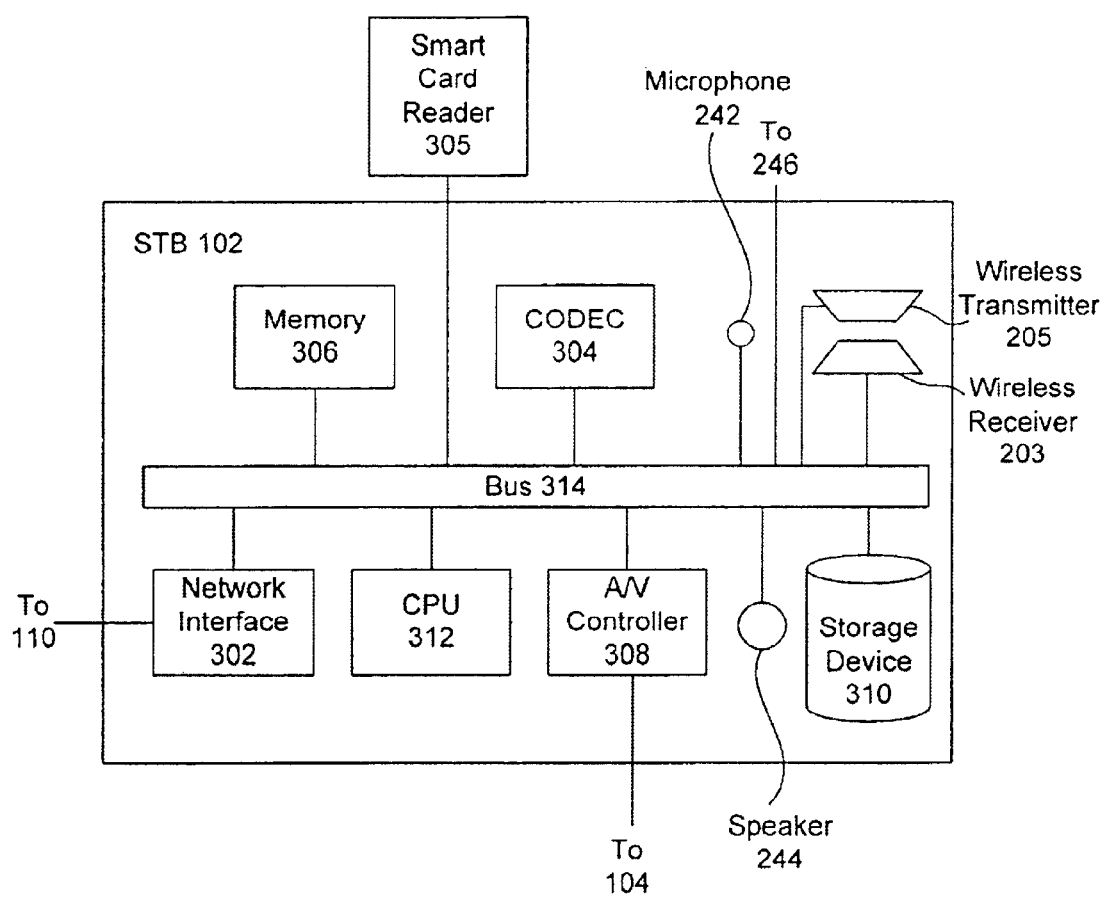
FIG. 3 is a block diagram of physical components of a set top box (STB)

In one embodiment, the remote control 106 further includes a microphone 242 for capturing audio signals. The captured audio signals may be transmitted to the STB 102 via the wireless transmitter 202. In addition, the remote control 106 may include a speaker 244 for generating audible output from audio signals received from the STB 102 via the wireless receiver 204. In alternative embodiments, as shown in FIG. 3, the microphone 242 and/or speaker 244 may be integrated with the STB 102.

In certain embodiments, the remote control 106 also includes a video camera 246, such as a CCD (charge-coupled device) digital video camera, for capturing video signals. In one implementation, the video camera 246 is in communication with the wireless transmitter 202 for sending the captured video signals to the STB 102. Like the microphone 242 and speaker 244, the video camera 246 may be integrated with the STB 102, or attached to the STB 102, as in the depicted embodiment.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone.

The optional keyboard 108 facilitates rapid composition of text messages. The keyboard 108 includes a plurality of standard alphanumeric keys 236. In one configuration, the keyboard 108 includes a wireless transmitter (not shown), similar or identical to the wireless transmitter 202 of the remote control 106. The wireless transmitter transmits keystroke data from the keyboard 108 to the STB 102. Additionally, the keyboard 108 may include one or more of the buttons illustrated on the remote control 106.

Alternatively, or in addition, a hands-free headset 248 may be coupled to the remote control 106 or the keyboard 108. The headset 248 may be coupled using a standard headset jack 250. The headset 248 may include a microphone 242 and/or speaker 244. Such a headset 248 may be used to reduce audio interference from the television 104 (improving audio quality) and to provide the convenience of hands-free operation.

Referring now to FIG. 3, there is shown a block diagram of physical components of an STB 102 according to an embodiment of the invention. As noted above, the STB 102 may include a wireless receiver 203 for receiving control signals sent by the wireless transmitter 202 in the remote control 106 and a wireless transmitter 205 for transmitting signals (such as audio/video signals) to the wireless receiver 204 in the remote control 106.

The STB 102 also includes, in one implementation, a network interface 302 for communicating with the network 101 via the broadcast center 110. The interface 302 may include conventional circuitry for receiving, demodulating, and demultiplexing MPEG packets. The interface 302 may also include conventional modem circuitry for sending or receiving data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a codec (encoder/decoder) 304, which serves to encode audio/video signals into a network-compatible data stream for transmission over the network 101. The codec 304 also serves to decode a network-compatible data stream received from the network 101. The codec 304 may be implemented in hardware and/or software. Moreover, the codec 304 may use various algorithms, such as MPEG or Voice over IP (VoIP), for encoding and decoding.

The STB 102 may include or be coupled to a smart card reader 305 for accessing digital information stored within a smart card or similar device. A smart card is a non-volatile memory device that may include, for instance, a microprocessor. A variety of smart card readers 305 and associated media are available, which are well known to those skilled in the art. In one embodiment, the smart card reader 305 is used to read identification credentials, such as digital signatures, digital certificates, pass codes, pass phrases, biometric data, or the like, from a user's smart card in order to authenticate the user for viewing requested digital content. Of course, a smart card reader 305 is not required in every embodiment.

The STB 102 further includes a memory device 306, such as a random access memory (RAM), for storing temporary data. In certain configurations, the memory 306 may be configured to prevent physical tampering and may only be accessible to trusted devices and/or software modules. For example, the memory 306 may be configured to be automatically erased if disassembled. Of course, a read-only memory (ROM) may also be provided for storing more permanent data, such as fixed code and configuration information.

In one embodiment, an audio/video (AV) controller 308 is provided for converting digital audio/video signals into analog signals for playback/display on the television 104. The A/V controller 308 may be implemented using one or more physical devices, such as separate graphics and sound controllers. The AV controller 308 may include graphics hardware for performing bit-block transfers (bit-blits) and other graphical operations for displaying a graphical user interface (GUI) on the television 104.

In some implementations, the STB 102 may include a storage device 310, such as a hard disk drive or the like. The storage device 310 may be configured to store encoded incoming and outgoing video signals as well as television broadcasts and retrieve the same at a later time for display. The storage device 310 may be configured, in one embodiment, as a digital video recorder (DVR), enabling scheduled recording of television programs, pausing (buffering) live video, etc. The storage device 310 may also be used in various embodiments to store viewer preferences, parental lock settings, electronic program guide (EPG) data, passwords, e-mail messages, video messages, video greetings, and the like. In one implementation, the storage device 310 also stores an operating system (OS) for the STB 102, such as Windows CE® or Linux®.

As noted above, the STB 102 may include, in certain embodiments, a microphone 242 and a speaker 244 for capturing and reproducing audio signals, respectively. The STB 102 may also include or be coupled to a video camera 246 for capturing video signals. These components may be included in lieu of or in addition to similar components in the remote control 106, keyboard 108, and/or television 104.

A CPU 312 controls the operation of the STB 102, including the other components thereof, which may be coupled to the CPU 312 in one embodiment via a bus 314 and/or various standard interfaces, e.g., RS-232, USB, etc. The CPU 312 may be embodied as a microprocessor, a microcontroller, a digital signal processor (DSP) or other device known in the art. For instance, the CPU 312 may be embodied as an Intel® x86 processor. As noted above, the CPU 312 may perform logical and arithmetic operations based on program code stored within the memory 306 or the storage device 310.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

FIGS. 4–8 are high-level dataflow diagrams illustrating various operations and transactions according to embodiments of the invention. Of course, the illustrated embodiments may be modified in various ways without departing from the spirit and scope of the invention.

Figure 4:
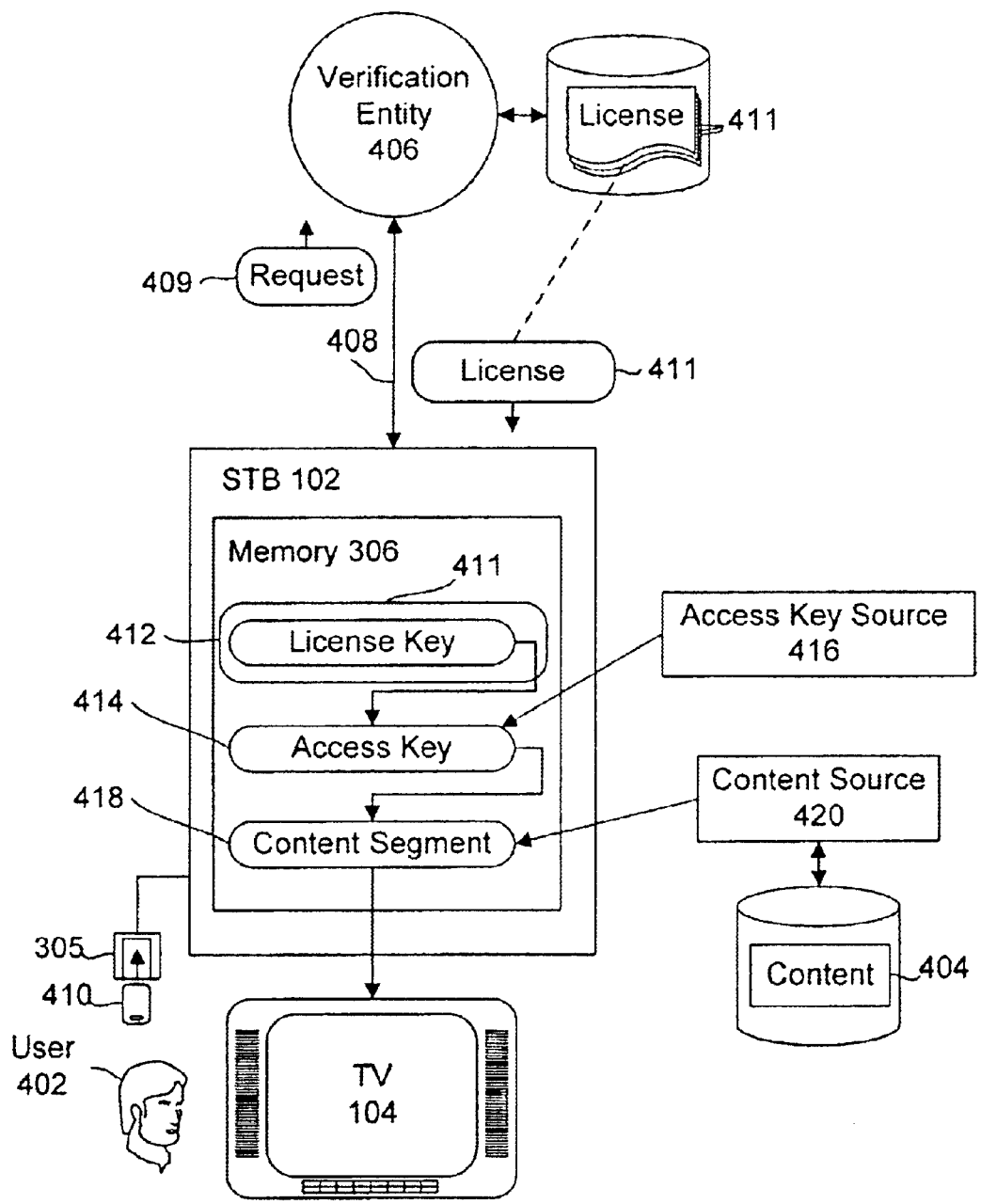
FIG. 4 is a dataflow diagram according to a first embodiment of the invention.

Referring now to FIG. 4, a user 402 may desire to view or listen to a specific program of digital content 404, such as a movie, television show, musical performance, etc. In one embodiment, the user 402 specifies the desired content 404 via a user interface (not shown) displayed on the television 104. For example, the user 402 may select from a displayed list of pay-per-view (PPV) movies or the like.

Depending on the content 404 requested, an appropriate verification entity 406 may be selected. While the following specification describes only a single verification entity 406, a plurality of verification entities 406 may exist within the scope of the invention. For example, different movie studios and/or television networks may be associated with different verification entities 406.

In the depicted embodiment, a single verification entity 406 may be affiliated with the user's cable or satellite provider. In such an embodiment, the verification entity 406 may be located within a broadcast center 110 or other node of the broadband network 101. Of course, the verification entity 406 may also be accessible via the Internet 112.

In one configuration, the STB 102 communicates with the verification entity 406 through a persistent network connection 408, such as a cable modem, digital subscriber line (DSL), or local area network (LAN) connection. As used herein, the term "persistent" simply means that the STB 102 is generally in communication with verification entity 406 via the network 101, the broadcast center 110, and/or the Internet 112. Accordingly, the STB 102 may communicate with the verification entity 406 at any time without a time-consuming and unreliable dial-in procedure, as in the case of an analog telephone modem. Alternatively, an analog telephone modem may be used as a back-up network connection when the persistent network connection 408 is unavailable. Of course, a temporary network communication may be used within alternative embodiments of the invention, as described hereafter.

The STB 102 may communicate with the verification entity 406 using secure communication protocols, such as Secure Sockets Layer (SSL), Secure HyperText Transfer Protocol (S-HTTP), or the like. Thus, data transmitted between the STB 102 and the verification entity 406 may be encrypted to prevent unauthorized reception of keys and other sensitive data.

Once the desired content 404 is selected, the identity of the user 402 is established with the verification entity 406. This may be done using various techniques known in the art. For example, in one embodiment, a user's identification credentials (not shown) are read from a smart card 410 inserted into a smart card reader 305. The identification credentials may include, for instance, a digital signature, a digital certificate, a pass code, a pass phrase, biometric data, or the like, which serve to identify the user and prevent repudiation of a transaction. Of course, a smart card 410 is not required in every embodiment.

The identification credentials, along with an indication of the desired digital content 404, may be encapsulated within a request 409, which is sent to the verification entity 406 via the network connection 408. The request 409 may be embodied in various forms, depending on the hardware and software being used, as well as the level of verification required. For example, the request 409 may be formatted according to the eXtensible Markup Language (XML) standard.

In certain embodiments, the authentication process may require the user 402 to enter additional information via the remote control 106 or keyboard 108, such as a pass code or pass phrase, which is likewise sent to the verification entity 406 with or following the request 409. In addition, the user may need to have current biometric data scanned by a biometric reading device (not shown), such as a fingerprint or retinal scanner, which is also sent with or following the request 409 for verification purposes.

In certain embodiments, the verification of identity credentials may include checking the identity credentials with a trusted third party (TTP), such as a certification authority (CA). For example, digital certificates may be verified with a CA before the user's identity is established with the verification entity 406. Techniques for user identification and authentication are well known in the art, and a detailed discussion thereof will not be presented here.

Once the user's identity is established, the verification entity 406 searches stored licenses 411 for the user 402 for one corresponding to the requested digital content 404. As described in greater detail below, the verification entity 406 may store a license 411 for each program of digital content 404 that the user 402 is authorized to view. The license 411 may be encapsulated within any suitable data structure, such as a record, list, database table, or the like.

In one embodiment, each license 411 may be associated with a license key 412. As described more fully below, the license key 412 includes information needed to unlock one or more levels of encryption in order to view the requested digital content 404. For example, in one embodiment, the license key 412 is used to decrypt an access key 414, which is, itself, used to decrypt the requested content 404. Many levels of encryption employing various encryption ciphers may be used to protect the digital content 404. However, to gain access through all the encryption levels, an original key is needed, together with keys for decrypting each encryption level. The license key 412 represents this original key.

As described below, a license 411 may be time-based, e.g., the license lasts for a fixed amount of time or may be set to expire at a particular date and time. Alternatively, the license 411 may be based on a set number of viewings. Of course, a wide variety of other license terms defining rights and constraints of the license 411 may be provided within the scope of the invention, including combinations of rights and constraints. In addition, the license 411 may include a restriction on the number of sublicenses, discussed in more detail below, which may be created based on the license 411. In another embodiment, the license 411 may include a restriction on the number of generations of sublicenses, based on the license 411.

Assuming that a license 411 to view the requested content 404 is located for the user 402 and that the license 411 has not expired or been exhausted, in one embodiment, the verification entity 406 sends the corresponding license 411 to the requesting STB 102. The license 411 may be temporarily stored within volatile, tamper-proof memory 306 in the STB 102.

If a valid license 411 is not found, the user 402 may be presented with the option of purchasing a license 411 on various terms specified by the owner of the content 404. For example, the user 402 may be given the option of purchasing either a time-based or viewings-based license 411 or the like.

As noted above, the STB 102 also receives, in one embodiment, an encrypted access key 414 from an access key source 416. The access key 414 is a key which is used to actually decrypt all or part the digital content 404. The access key 414 is preferably encrypted in such a way that it may only be decrypted using the license key 412. Various encryption techniques, symmetric and/or asymmetric (public key), may be used, the precise selection of which is not crucial to the invention.

In one embodiment, the access key 414 may be one of a series of keys in an access key stream (not shown). Each access key 414 in the stream may correspond to a different segment of digital content 404. Accordingly, the content 404 may be encrypted using many different keys, which then requires many different access keys 414 for decryption. Thus, while the following description may refer to "access key" in the singular, it should be recognized that the term is synonymous with "access key stream".

In one configuration, the access key source 416 is a server communicating with the STB 102 via the network connection 408. For instance, the access key source 416 may be located within a broadcast center 110 or may be a separate server accessible via the network 101 or the Internet 112. In yet another embodiment, as described more fully below, the access key source 416 may be embodied as physical media which also contains the digital content 404. In certain embodiments, the STB 102 may receive a license 411 including a license key 412. The license key 412 may be extracted from the license 411. The STB 102 decrypts the access key 414, in one embodiment, using the license key 412. In certain configurations, once the access key 414 or key stream is decrypted the license key 412 and/or license 411 may be deleted. Alternatively, the license key 412 and/or license 411 may be stored in secure memory 306 which is blocked from unauthorized reads and writes. The decrypted access key 414 may be temporarily stored in tamper-proof, volatile memory 306, before being used to decrypt the digital content 404. In the case of a stream of access keys 414, the STB 102 may decrypt all of the keys 414 in the stream at once, or it may decrypt the keys 414 just in time to decrypt corresponding portions of the digital content 404.

The STB 102 then receives (or may have previously received) a segment 418 of digital content 404 from a content source 420. The content source 420 may be embodied as a server in communication with the STB 102 via the network connection 408. For instance, the content source 420 may be located within a broadcast center 110 or may be a separate server accessible via the network 101 or the Internet 112. As described more fully below, the content source 420 may also be physical media.

Embodiments in which the digital content 404 resides on content source 420 accessible via the network connection 408 provide a number of benefits for a user 402. For example, the user 402 need not store and organize physical media storing the digital content 404. The user 402 may simply access licensed digital content 404 from any device, e.g. STB 102, connected to the network 101. In addition, the user 402 may store the digital content 404 on physical media such as CDs, DVDs, or a storage device 310 of the STB 102. However, if the physical media are destroyed, misplaced, or damaged, the user 402 may still access digital content 404 for which the user 404 owns a license 411. The digital content 404 may be accessed to make a replacement copy of the original physical media. Thus a user 402 may easily manage large libraries of digital content 404 and provide back-up copies when needed.

The STB 102 uses the decrypted access key 414 to decrypt the content segment 418. The STB 102 then outputs the decrypted content segment 418 to an output device, such as the TV 104, for display. The above-described process may be repeated for all of the segments 418 of the digital content 404.

Once all of the content 404 is decrypted, the license key 412 and/or license 411 and any decrypted access keys 414 may be deleted from the memory 306 in one embodiment. Likewise, if the STB 102 is turned off, or playback of the content 404 is interrupted for a period of time, the license key 412 and/or license 411 and any decrypted access keys 414 may be erased, requiring the STB 102 to re-establish communication with the verification entity 406 to obtain the license key 412 and/or license 411 again.

Thus, the user 402 may obtain access to digital content 404 based on the user's license 411 stored at the verification entity 406. Unlike conventional systems, the license 411 is not tied to the user's STB 102. Therefore, the user 402 may view the program using a friend's STB 102 simply by inserting his or her smart card 410 and/or providing the necessary pass code, pass phrase, biometric data, or the like.

Figure 5:
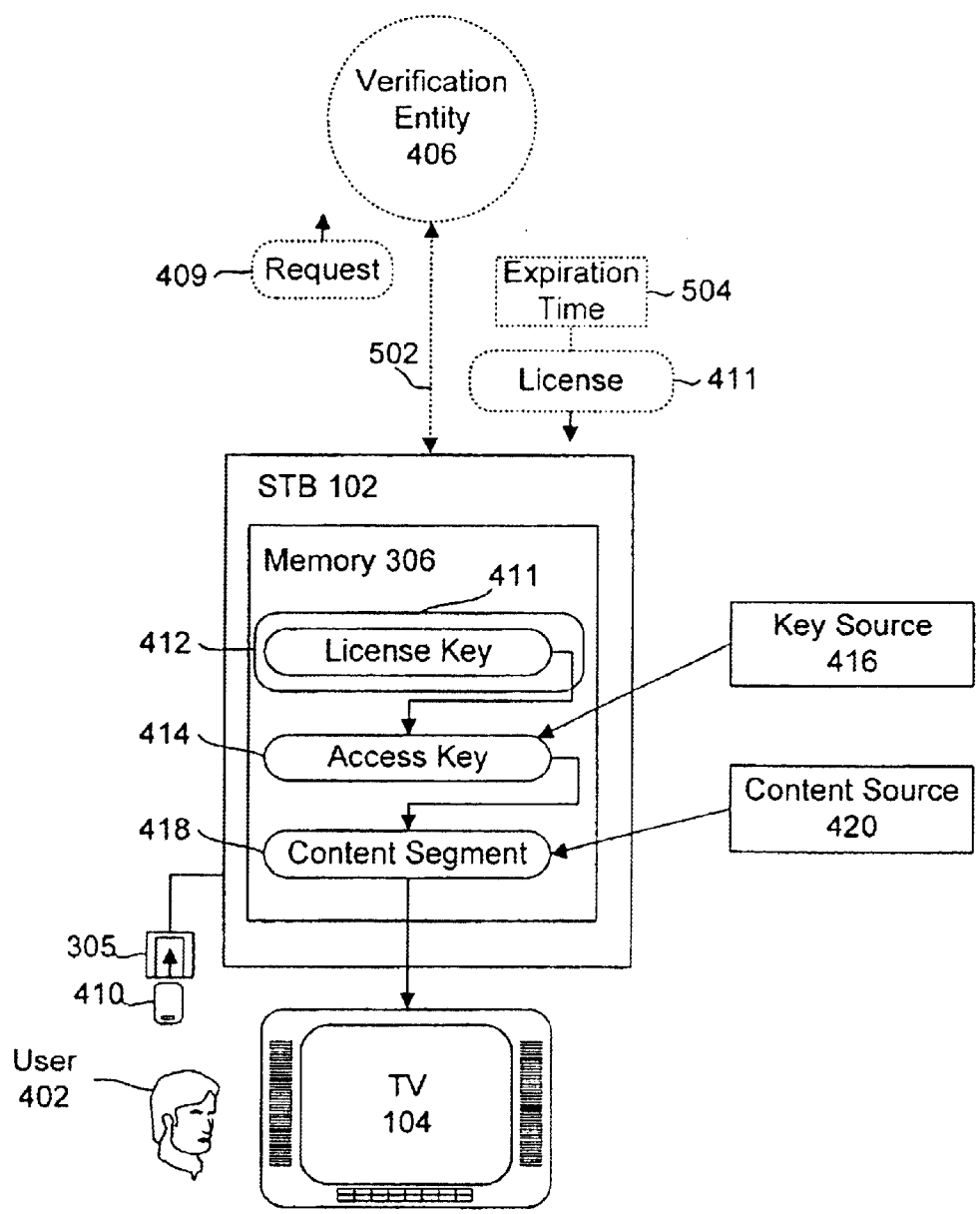
FIG. 5 is a dataflow diagram according to a second embodiment of the invention.

In an alternative embodiment, as shown in FIG. 5, a persistent network connection 408 is not necessary. Rather, an STB 102 may periodically establish a temporary network connection 502, such as an analog telephone modem connection. In addition, or in the alternative, a persistent network connection 408 may include multiple connection techniques which serve as back-up connection methods if the regular persistent network connection 408 is unavailable. Alternatively, the temporary network connection 502 may be a persistent connection that is temporarily coupled to a portable digital content player. For example, a portable DVD player may be coupled to the network 101 for a short time to receive a license 411 from a verification entity 406.

The STB 102 may use the temporary network connection 502 to access a verification entity 406, send a request 409, establish a user's identity, and receive a license 411, all as described in relation to FIG. 4. In this embodiment, the STB 102 may store the license 411 and/or license key 412 in volatile memory 306. Once the license key 412 is stored, the temporary network connection 502 may be disconnected. As long as the license key 412, and/or license 411 in certain embodiments, is stored, the STB 102 may decrypt the access key 414 and, hence, the digital content 404.

In one embodiment, the license 411 may be associated with an expiration time 504 that may be independent of any of the licensing terms of the license 411. Typically, the expiration time 504 is shorter than a time-based licensing term, e.g., where a time-based license is seven days, the expiration time may be two or three days.

Once the expiration time 504 has passed, the STB 102, in one embodiment, automatically deletes the license 411 (and any decrypted access keys 414), requiring a temporary connection 502 to be re-established before the content 404 may again be viewed. Alternatively, the STB 102 may block access to the license 411 until the license 411 is re-verified. Until the expiration time 504 has passed, the license 411 and corresponding license key 412 may continue to be used by the STB 102, in one embodiment, without re-establishing the temporary connection 502. One purpose for the expiration time 504 is to allow the convenience of temporary connections 502, while recognizing that a user 402 may transfer the license 411, in whole or in part, before the natural termination thereof. Additionally, a license 411 may be revoked in certain circumstances, such as for non-payment.

Of course transfers of licenses 411 or portions of licenses, sublicenses, may include rules and restrictions in certain embodiments. For example, once a sublicense is created and transferred, the parent license may be revoked for a set time period corresponding to a valid time period for the sublicense. This period of time may be a "loan period." During the "loan period" the sublicense may be valid while the parent license is not. After the "loan period" the sublicense may be revoked and the parent license 411 re-activated. Reactivation of the parent license 411 may occur automatically.

In another embodiment, sublicenses may be valid only after one or more parent licenses 411 in a hierarchy is verified. As an example, a user 402 may purchase a license 411 to view a program of digital content 404 for a period of one week. However, the expiration time 504 may be set for a period of three days. Accordingly, for three days, the user 402 may continue to view the digital content 404 without the STB 102 re-establishing a temporary connection 502. After three days, however, the license 411, license key 412 and any decrypted access keys 414 may be deleted from the memory 306 of the STB 102, requiring a new temporary connection 502 be established in order to view the program during the four days remaining on the license 411.

Alternatively, the STB 102 may simply block access to the license 411 and/or license key 412 stored in memory 306. For example, the STB 102 may prohibit any read or write commands to the portion of memory 306 storing the license 411 and/or license key 412 until the license 411 is verified with the verification entity 406.

When a new temporary connection 502 is established, the verification entity 406 may determine whether the license 411 has been revoked, transferred, or the like. If the license 411 is still valid, the license 411 including the license key 412 may again be transmitted to the STB 102.

Figure 6:
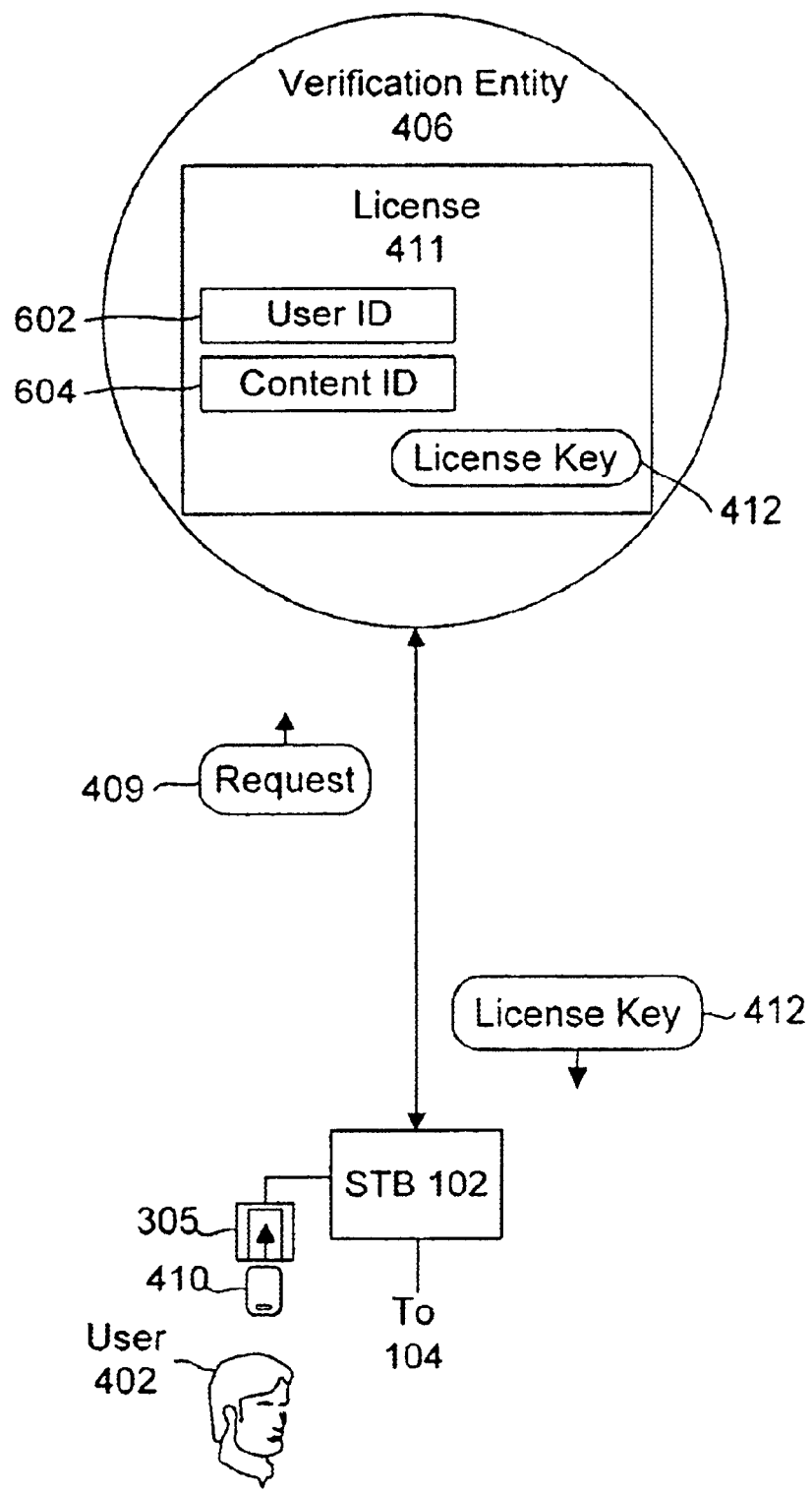
FIG. 6 is a dataflow diagram according to a third embodiment of the invention.

FIG. 6 illustrates further details of the above-described process from the standpoint of the verification entity 406. As previously noted, the request 409 may include a user identifier 602 (which may include identity credentials) and a content identifier 604. In one embodiment, the user identifier 602 uniquely identifies the user 402, while the content identifier 604 uniquely describes or identifies the requested content 404. For example, the request 409 may include a personal network address (e.g., ENUM address), user identifier, or e-mail address unique to the user 402, as well as a serial number or title of a particular program of digital content 404.

The user identifier 602 and content identifier 604 may be used to quickly locate a license 411 among a plurality of licenses 411. In one embodiment, the verification entity 406 searches a database of licenses 411 in a storage device associated with the verification entity 406. Those of skill in the art will recognize that licenses 411 may be stored in various formats, using various database management systems (DBMS) remote or local to the verification entity 406.

As previously noted, the license 411 may be a license key 412. Alternatively, the license key 412 may be stored separately and linked to the license 411. Furthermore, the license 411 may include a plurality of license keys 412 (e.g., a key stream) for particular digital content 404.

Figure 7:
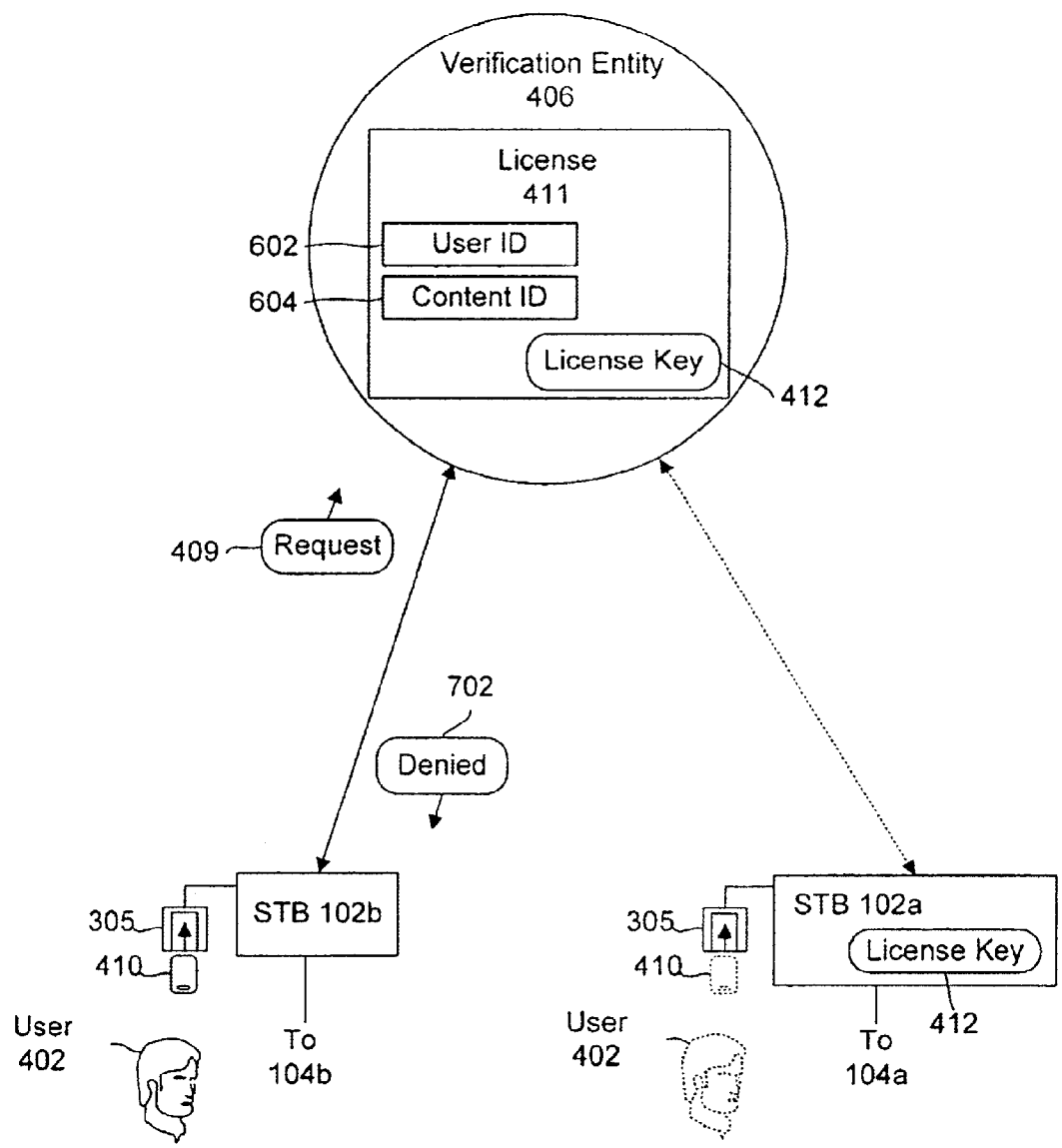
FIG. 7 is a dataflow diagram according to a fourth embodiment of the invention.

In certain embodiments, as shown in FIG. 7, the verification entity 406 may take steps to prevent concurrent use of a license 411 on different machines, e.g., different STBs 102a–b. For example, a first STB 102a may have already received a license 411 and/or license key 412 and may be in the process of decrypting the content 404 for display. However, while this is occurring, the user 402 may present his or her smart card 410 at a second STB 102b in an attempt to concurrently view the content 404 at a different location. Such an attempt may be deliberate or inadvertent.

In one embodiment, the verification entity 406 may query the STB 102a that last requested the license 411 to determine whether the license 411 and/or license key 412 has been deleted (e.g., viewing of the content 404 has been completed) or still exists (viewing of the content 404 may be underway).

In another embodiment, the verification entity 406 not only checks for the existence of the license 411 and/or license key 412. Instead, the verification entity 406 may determine whether the license 411 on an STB 102a has been permanently or temporarily revoked. In certain embodiments, a license 411 may be temporarily revoked during a set period of time that a sublicense based on the license 411 is valid. If the license 411 does not exist or is not valid on the STB 102a, other STBs 102, e.g. STB 102b may be allowed to receive and use the license 411 or a copy thereof.

In one embodiment, if a license key 412 still exists within the first STB 102a, the verification entity 406 may send a "denied" message 702 to the second STB 102b. Of course, the user may still be able to view the content 404 on the second STB 102b. However, the user 402 may need to first terminate the viewing of the content 404 on the first STB 102a in one embodiment. In alternative embodiments, the license key 412 may still be sent, but the user 402 may be assessed a concurrent-use fee.

Of course while a license key 412 is depicted, those of skill in the art recognize that the whole license 411, or a subset of the license 411 including the license key 412 may be sent between the verification entity 406 and an STB 102.

Figure 8:
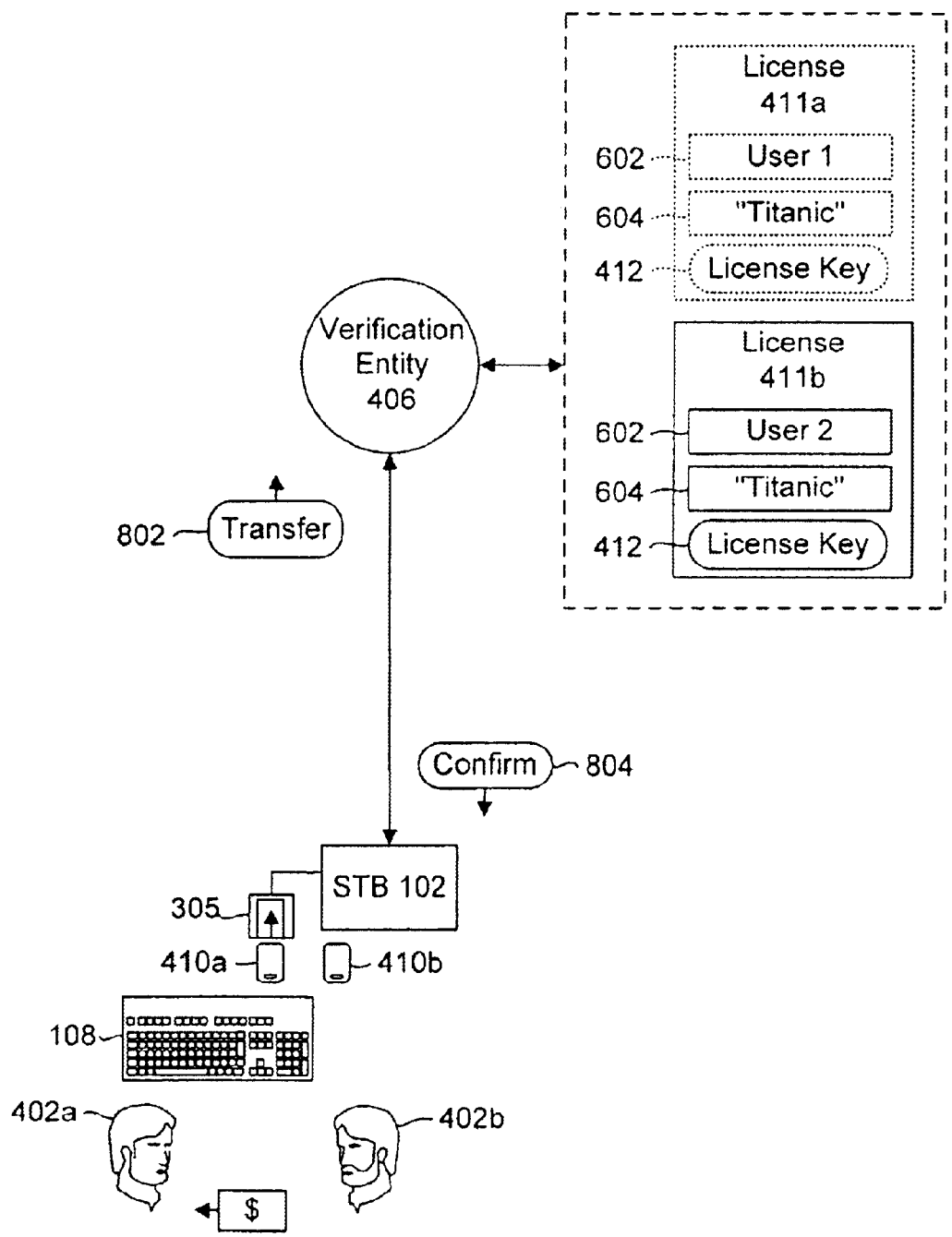
FIG. 8 is a dataflow diagram according to a fifth embodiment of the invention.

Referring now to FIG. 8, a first user 402a may transfer all or part of his or her license 411 to second user 402b. In certain embodiments, because the licenses 411 are maintained by the verification entity 406, a first user 402a may use his or her smart card 410, an STB 102, and possibly a keyboard 108 or remote control 106 to request a transfer 802 of all or part of the license 411 to the second user 402b. Thus, the transfer 802 may effectively function as an assignment or sublicense of the user's original license 411, and may be transferred by gift or sale.

For example, a second user 402b may pay a first user 402a for all of the first user's license 411. The first user 406a then accesses the verification entity 406 and establishes his/her identity using the smart card 410 or other technique. As with the request 409 discussed above, a transfer request 802 may include the first user's identity credentials.

The first user 402a may then indicate which license 411 (e.g., by title, serial number, etc.) is to be transferred to the second user 402b. Assuming that the license 411 is still valid, a confirmation message 804 may be sent, indicating that the transfer has been completed.

As illustrated, the original license 411a, indicated by dashed lines, may then be modified such that the user identifier 602 (including any stored identity credentials) refers to the second user 402b rather than the first user 402a. Alternatively, the original license 411a may be deleted and a new license 411b in favor of the second user 402b may be created. After the transfer, only the second user 402b is allowed access to the digital content 404 associated with the license 411b.

In other embodiments, the first user 402a may transfer only a portion of his or her license 411, which has the effect of creating a sublicense comprising a portion of viewing rights originally held by the first user 402a. For example, the first user's license 411a may have originally included a set number of viewings, such as ten viewings. The first user 402a may initiate a transfer 802 which reduces the number of viewings of the license 411a to five and creates a new license 411b for the second user 402b including five viewings. In some embodiments, the portions of a license 411, e.g. sublicenses, may be verified by authenticating the remainder portions of the original license 411.

In certain implementations, the first user 402a may access the verification entity 406 using a terminal other than an STB 102. For example, the first user 402a may access the verification entity using a personal computer (PC) or personal digital assistant (PDA). In such embodiments, the other terminal may include a smart card reader 305 or the like for verifying the user's identity.

Where the verification entity 406 is in communication with the access key source 416, for each transfer of at least a portion of a license 411, a new license key 412 may be generated for each user 402a–b. Thus, the security of the digital content 404 is enhanced. Alternatively, the same license key 412 may be used in both licenses 411. In general, the verification entity 406 will be in communication with the access key source 416 and/or the content source 420 to ensure that the license keys 412, access key(s) 414, and content segment(s) 418 remain synchronized.

Figure 9:
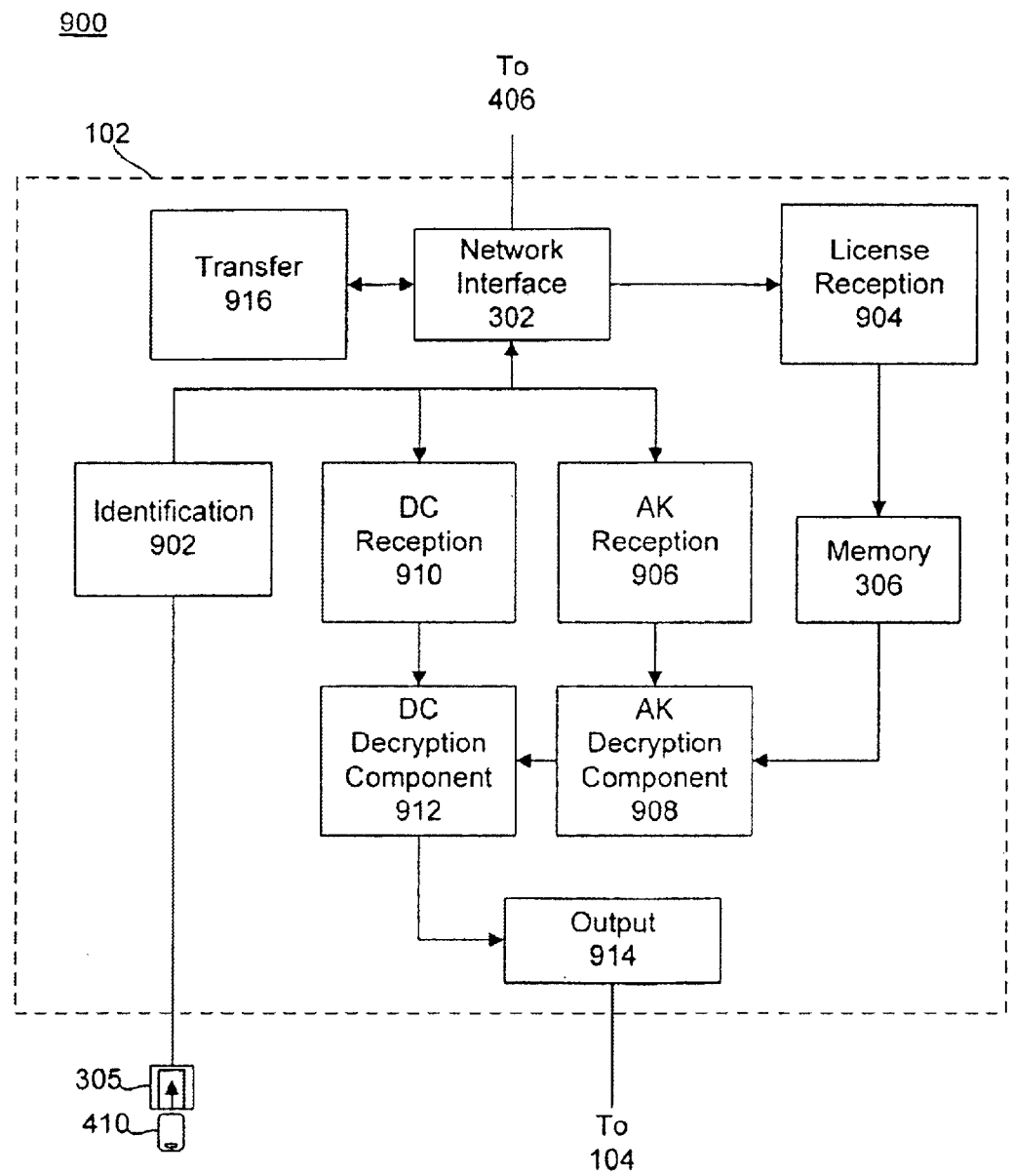
FIG. 9 is a block diagram of logical components of a client system for providing conditional access to digital content.

FIG. 9 illustrates a client system 900 for providing conditional access to digital content 404. The depicted logical components of FIGS. 9 and 10 may be implemented using one or more of the physical components shown in FIG. 3. Of course other well known physical components typically used in an STB 102 may be used to implement the depicted logical components. Additionally, or in the alternative, various logical components may be implemented as software modules stored in the memory 306 and/or storage device 310 and executed by the CPU 312. Those skilled in the art will recognize that the various illustrated components may be combined together or integrated with standard components in various configurations without departing from the scope or spirit of the invention.

As described in detail above, a network interface 302 accesses the verification entity 406 via a persistent network connection 408. Alternatively, a temporary network connection 502 may be used. The network interface 302 sends and receives packets to and from the network 101. As mentioned above, the network interface 302 may include software and/or other hardware modules for establishing secure network connections with other devices on the network 101.

The system 900 may also include an identification component 902 in communication with the network interface 302. In one implementation, the identification component 902 is coupled to a smart card reader 305 configured to read a user's smart card 410. The identification component 902 may also include one or more hardware/software modules for extracting and sending a user's identity credentials, as described in connection with FIG. 4.

The network interface 302 may be coupled to a license reception component 904. The license reception component 904 is configured to receive a license 411 and/or license key 412 from the network interface 302. In one embodiment, the license reception component 904 stores the license 411 and/or license key 412 in memory 306. Alternatively, the license 411 and/or license key 412 may remain within the license reception component 904. For example, the license reception component 904 may include a tamper-proof memory for storing the license 411 and/or license key 412. Tampering with the memory may cause the memory to be erased.

The system 900 may also include an access key (AK) reception component 906 coupled to the network interface 302. The AK reception component 906 receives an access key 414 from the key source 416, as discussed above. Alternatively, the AK reception component 906 may be configured to receive a stream of access keys 414. For example, the AK reception component 906 may comprise a buffer for holding a segment of an access key stream 414.

In one configuration, the AK reception component 906 and memory 306 are coupled to the AK decryption component 908. The AK decryption component 908 reads the license key 412 from memory 306 and uses the license key 412 to decrypt the access key 414. As described above in relation to FIG. 4, the AK decryption component 908 may support various decryption ciphers. Additionally, the AK decryption component 908 may be implemented using software components, hardware components, or a combination thereof.

Furthermore, the system 900 may include a digital content (DC) reception component 910 coupled to the network interface 302 and a DC decryption component 912. As discussed in detail above, the DC reception component 910 receives encrypted digital content 404 from a content source 420. As with the AK reception component 906, the DC reception component 910 may also include a buffer for temporarily storing digital content segments 418.

In one configuration, the digital content segments 418 are sent to the DC decryption component 912. The DC decryption component 912 decrypts the digital content segments 418 using the decrypted access key 414 from the AK decryption component 908. As with the AK decryption component 908, the DC decryption component 912 may be implemented in hardware and/or software and use one or more different decryption ciphers.

The DC decryption component 912 may then provide the decrypted digital content segments 418 to an output component 914. The output component 914 provides an output signal for display on a display device, such as a TV 104. The output component 914 may include or be coupled to an A/V controller 308, as discussed in relation to FIG. 3. The output component 914 may decode the segments 418 using MPEG or any other suitable technique.

In certain embodiments, the system 900 includes a transfer component 916. The transfer component 916 may provide an interface with the user 402 to allow the user 402 to instruct a verification entity 406 to transfer all or part of a license 411 to another user 402. The transfer component 916 may also cooperate with the identification component 902 to provide identity credentials for the user 402. In certain embodiments, the transfer component 916 may be implemented in the context of a Web browser, such as Microsoft Internet Explorer®, which may interact with a corresponding Web server within the verification entity 406.

Figure 10:
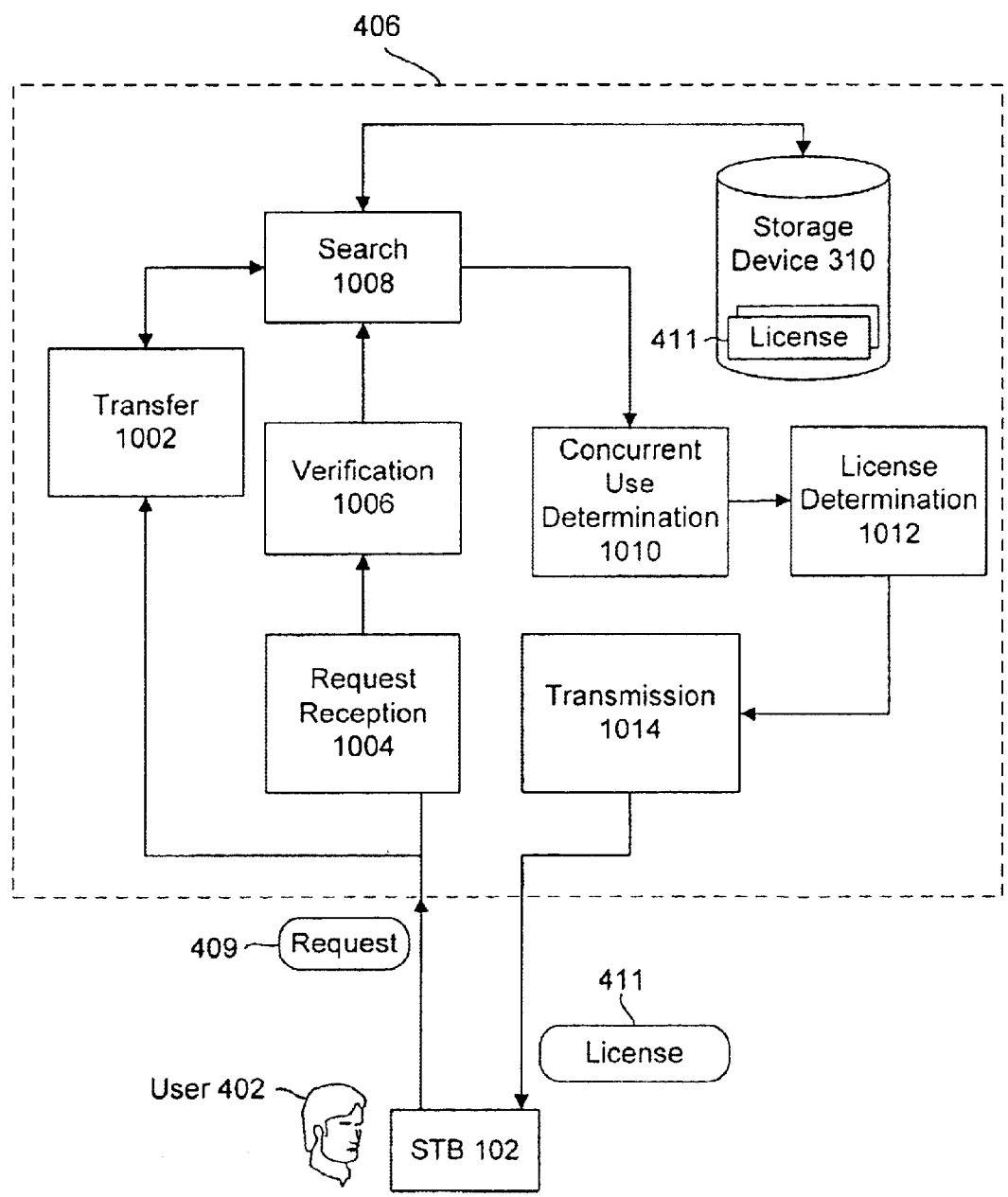
FIG. 10 is a block diagram of logical components of a server system for providing conditional access to digital content.

FIG. 10 illustrates one possible configuration of a server system 1000, which may be a subsystem of the verification entity 406 and may communicate with the client system 900 of FIG. 9. For example, the transfer component 916 of the client system 900 may communicate with a transfer component 1002 of the server system 1000 to complete a transfer of at least a portion of a license 411.

The server system 1000 includes a request reception component 1004 that receives a request 409 from a user 402 to view specific digital content 404. The request reception component 1004 may include software modules, hardware, or a combination thereof. For example, the request reception component 1004 may include a network interface 302 similar to that described in FIG. 3.

The request reception component 1004 may extract identity credentials for the user 402 which are passed to a verification component 1006. The verification component 1006 may review the identity credentials to verify the user's identity. In certain configurations, the verification component 1006 may communicate with a certification authority to verify the user's identity. The verification component 1006 may also request additional information, such as pass codes or verifying biometric data.

The verification component 1006 may be coupled to a search component 1008. The search component 1008 searches a plurality of licenses 411 stored in a storage device, as described above. The storage device may be local to the server system 1000 or may be accessed remotely via a network.

In certain embodiments, the system 1000 includes a concurrent use determination component 1010. As described in relation to FIG. 7, the concurrent use determination component 1010 determines whether a device other than the requesting device currently has a license key 412 for requested digital content 404. In one embodiment, if the license key 412 is already in use, the concurrent use determination component 1010 prevents a second license key 412 from being sent and may send a denied message 702 to the requesting device.

In one configuration, the concurrent use determination component 1010 communicates with a license determination component 1012. If the concurrent use determination component 1010 allows a license key 412 to be sent, the license determination component 1012 determines whether the license is expired or exhausted. As discussed above, the license terms may be based on time, number of viewings, or the like.

Finally, if the concurrent use determination component 1010 and license determination component 1012 allow transmission of the license 411 and/or license key 412, a transmission component 1014 sends the license 411 and/or license key 412 to the user 402. As discussed earlier, the license key 412 permits a user's STB 102 to decrypt an access key 414 which, in turn, allows the STB 102 to decrypt the licensed digital content 404.

Figure 11:
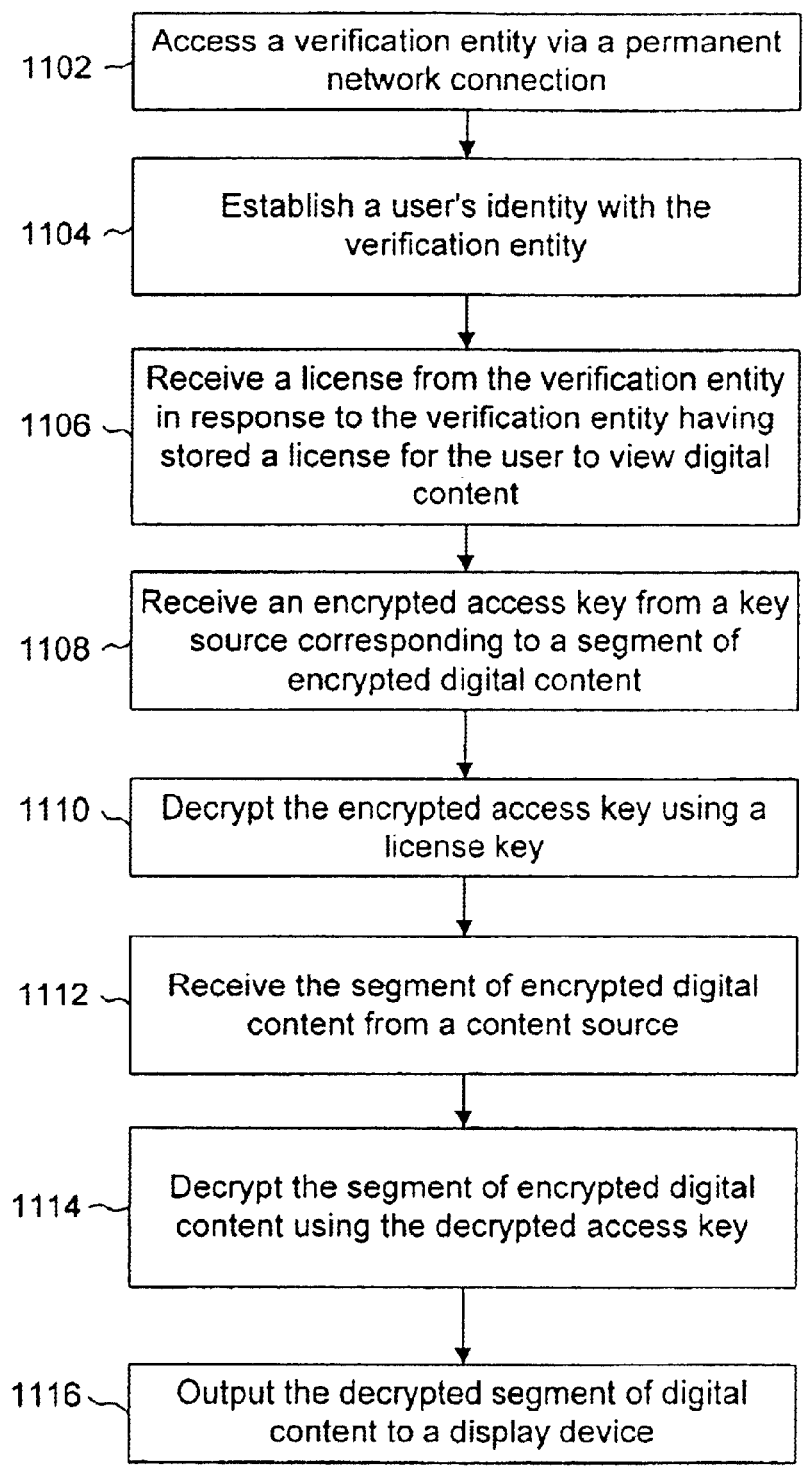
FIG. 11 is a flowchart of a method for providing conditional access to digital content.

Referring now to FIG. 11, there is shown a flowchart of a method 1100 for providing conditional access to digital content 404. The method 1100 begins by accessing 1102 a verification entity 406 via a persistent network connection 408. Once access is established, a request 409 to view the digital content 404 may be sent to the verification entity 406. Next, the user's identity is established 1104, in one embodiment, using information contained within the request 409.

The verification entity 406 may then search a plurality of licenses 411 for one associating the user 402 with the requested digital content 404. Having found a license 411, the license 411 may be checked for expiration, exhaustion, concurrent use, and other rights and restrictions as discussed above.

Thereafter, the STB 102 receives 1106 a license 411 comprising at least a license key 412 to view the digital content 404. Next, the STB 102 receives 1108 an encrypted access key 414 from a key source 416. The access key 414 corresponds to a segment of encrypted digital content 404.

The access key 414 is decrypted 1110 using the license key 412. The STB 102 receives 1112 a segment 418 of encrypted digital content 404 from a content source 420. The decrypted access key 414 is used to decrypt 1114 the segment 418 of encrypted digital content 404. Finally, the decrypted digital content 404 is output 1116 to a display device such as a TV 104. The decryption process then continues to display the digital content 404 to a user 402.

Based on the foregoing, the present invention offers a number of advantages not available in conventional approaches. A license 411 to view digital content 404 is associated with a user 402 rather than an STB 102. Accordingly, a user 402 may view licensed digital content 404 on more than one device (although not concurrently in one embodiment). The present invention permits more sophisticated content licensing models than a one-time or unlimited-viewing model. Moreover, the present invention allows a user to convey at least a portion of his or her license 411 to another user. Indeed, the present invention provides a digital content distribution system and method that approximates the loaning or selling of a physical article, such as a book, CD, or DVD.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A computer-implemented method for providing conditional access to digital content, the method comprising:
   accessing a verification entity via a persistent network connection;
   establishing a user's identity with the verification entity;
   receiving a license including a license key from the verification entity in response to the verification entity having stored a license for the user to view the digital content;
   receiving an encrypted access key from an access key source, the encrypted access key corresponding to a segment of encrypted digital content;
   decrypting the encrypted access key using the license key;
   receiving the segment of encrypted digital content from a content source;
   decrypting the segment of encrypted digital content using the decrypted access key;
   outputting the decrypted segment of digital content to an output device; and
   instructing the verification entity to transfer a sublicense comprising at least a portion of the user's license to another person.

2. The method of claim 1,
   wherein the license comprises a license to view the digital content a set number of times, and wherein the sublicense allows the other person to view the digital content at least a subset of the set number of times.

3. The method of claim 1,
   wherein the license comprises a license to view the digital content during an established time interval, and wherein the sublicense allows the other person view the digital content during at least a subset of the time interval.

4. The method of claim 1,
   wherein the license comprises a license to create a set number of sublicenses based on the license, and wherein the sublicense allows the other person to create at least a subset of the set number of sublicenses based on the license.

5. The method of claim 1, further comprising:
   receiving a request from the user to
   transfer at least a portion of the user's license to another person.

6. The method of claim 1, wherein establishing a user's identity comprises:
   providing user identity credentials to the verification entity, wherein the verification entity verifies the user identity credentials and determines whether the user has a license to view the digital content.

7. The method of claim 6, wherein providing user identity credentials comprises:
   reading the user identity credentials from a smart card in communication with the entertainment device.

8. The method of claim 1, wherein receiving an encrypted access key comprises receiving an encrypted access key stream corresponding to a plurality of segments of the encrypted digital content.

9. The method of claim 1, wherein receiving the segment of encrypted digital content comprises receiving an encrypted digital content stream from the content source.

10. The method of claim 1, wherein the verification entity determines whether a different entertainment device currently has a license to view the digital content, and wherein the verification entity only sends a license if a different entertainment device does not currently have a license to view the digital content.

11. The method of claim 1, wherein the verification entity determines whether a different entertainment device currently has a license to view the digital content, and wherein the verification entity only sends a license if a different entertainment device does not currently have a valid license to view the digital content.

12. The method of claim 1, wherein the license comprises a license to view the digital content a set number of times.

13. The method of claim 1, wherein the license comprises a license to create a set number of sublicenses based on the license.

14. The method of claim 1, wherein the license comprises a license to create a set number of generations of sublicenses based on the license.

15. The method of claim 1, wherein the license comprises a license to view the digital content during an established time interval.

16. The method of claim 1, wherein the access key is received via the persistent network connection.

17. The method of claim 1, wherein the encrypted content is received via the persistent network connection.

18. A computer-implemented method for providing conditional access to digital content, the method comprising:
   storing a plurality of licenses to view specific digital content, each license being associated with a particular user;
   receiving a request from a user of a specific entertainment device to view specific digital content;
   verifying the user's identity from information within the request;
   locating a license for the user to view the digital content;
   sending the license associated with the user, the license comprising at least a license key configured to decrypt an access key corresponding to a segment of encrypted digital content; and
   transferring a sublicense comprising at least a portion of the license to another person in response to a request from the user.

19. The method of claim 18, further comprising:
   receiving a request from a user to transfer at least a portion of the user's license to another person.

20. The method of claim 18, wherein the license is valid for a set number of viewings, further comprising:
   determining that the set number of viewings has not been exhausted prior to the license being sent.

21. The method of claim 18, wherein the license is valid for a period of time, further comprising:

determining that the valid time period has not expired prior to the license being sent.

22. The method of claim 18, wherein the license is valid for a period of time, further comprising:
determining whether the license is temporarily revoked for a set period of time to enable a sublicense.

23. The method of claim 18, wherein verifying the user's identity comprises:
receiving user identity credentials read from a smart card; and
verifying the user identity credentials.

24. The method of claim 18, wherein locating a license comprises:
searching the plurality of licenses for a license corresponding to the user and the requested digital content; and
in response to locating a license associating the user with the requested digital content, extracting from the license a license key configured to decrypt an encrypted access key corresponding to a segment of the digital content.

25. The method of claim 18, wherein sending a license comprises sending the license via a persistent network connection.

26. The method of claim 18, further comprising:
determining whether a different entertainment device currently has a license to view the digital content; and
wherein the license is only sent if a different entertainment device does not currently have a license to view the digital content.

27. The method of claim 18, wherein the encrypted access key comprises an encrypted access key stream corresponding to a plurality of segments of encrypted digital content.

28. The method of claim 18, wherein the segment of encrypted digital content comprises an encrypted digital content stream from the content source.

29. The method of claim 18, wherein the license comprises a license to view the digital content a set number of times, and wherein the sublicense allows the other person to view the digital content at least a subset of the set number of times.

30. The method of claim 18, wherein the license comprises a license to create a set number of sublicenses based on the license, and wherein the sublicense allows the other person to create at least a subset of the set number of sublicenses based on the license.

31. The method of claim 18, wherein the license comprises a license to create a set number of generations of sublicenses based on the license, and wherein the sublicense allows the other person to create at least a subset of the set number of generations of sublicenses based on the license.

32. The method of claim 18, wherein the license is disabled for a set period of time corresponding to an established time interval of a sublicense created from the license.

33. The method of claim 18, wherein the license comprises a license to view the digital content during an established time interval and wherein the sublicense allows the other person view the digital content during at least a subset of the time interval.

34. The method of claim 18, wherein the access key source comprises physical media.

35. The method of claim 18, wherein the content source comprises physical media.

36. A system for providing conditional access to digital content, the system comprising:
a network interface that accesses a verification entity via a persistent network connection;
an identification component that establishes a user's identity with the verification entity;
a license reception component that receives a license comprising a license key from the verification entity in response to the verification entity having stored a license for the user to view the digital content;
an access key reception component that receives an encrypted access key from an access key source, the encrypted access key corresponding to a segment of encrypted digital content;
an access key decryption component that decrypts the encrypted access key using the license key associated with the license;
an encrypted digital content reception component that receives the segment of encrypted digital content from a content source;
an encrypted digital content decryption component that decrypts the segment of encrypted digital content using the decrypted access key;
an output component that outputs the decrypted segment of digital content to a output device; and
a transfer component that instructs the verification entity to transfer a sublicense comprising at least a portion of the user's license to another person.

37. The system of claim 36,
wherein the license comprises a license to view the digital content a set number of times, and wherein the sublicense allows the other person to view the digital content at least a subset of the set number of times.

38. The system of claim 36,
wherein the license comprises a license to view the digital content during an established time interval, and wherein the sublicense allows the other person view the digital content during at least a subset of the time interval.

39. The system of claim 36,
wherein the license comprises a license to create a set number of sublicenses based on the license, and wherein the sublicense allows the other person to create at least a subset of the set number of sublicenses based on the license.

40. The system of claim 36,
wherein the transfer component is to receive a request to instruct the verification entity to transfer at least a portion of the user's license to another person.

41. The system of claim 36, wherein the identification component provides user identity credentials to the verification entity and wherein the verification entity verifies the user identity credentials and determines whether the user has a license to view the digital content.

42. The system of claim 41, further comprising:
a smart card reader that reads the user identity credentials from a smart card.

43. The system of claim 36, wherein the access key reception component receives an encrypted access key stream corresponding to a plurality of segments of the encrypted digital content.

44. The system of claim 36, wherein the encrypted digital content reception component receives an encrypted digital content stream from the content source.

45. The system of claim 36, wherein the verification entity determines whether a different entertainment device currently has a license to view the digital content, and wherein the verification entity only sends a license if a different entertainment device does not currently have a license to view the digital content.

46. The system of claim 36, wherein the verification entity determines whether a different entertainment device currently has a license to view the digital content, and wherein the verification entity only sends a license if a different entertainment device does not currently have a valid license to view the digital content.

47. The system of claim 36, wherein the license comprises a license to view the digital content a set number of times.

48. The system of claim 36, wherein the license comprises a license to create a set number of sublicenses based on the license.

49. The system of claim 36, wherein the license comprises a license to create a set number of generations of sublicenses based on the license.

50. The system of claim 36, wherein the license comprises a license to view the digital content during an established time interval.

51. The system of claim 36, wherein the access key is received via the persistent network connection.

52. The system of claim 36, wherein the encrypted content is received via the persistent network connection.

53. A system for providing conditional access to digital content, the system comprising:
    a storage device that stores a plurality of licenses to view specific digital content, each license being associated with a particular user;
    a request reception component that receives a request from a user of an entertainment device to view specific digital content;
    a verification component that verifies the user's identity from information within the request;
    a search component that locates a license for the user to view the digital content;
    a transmission component that sends the license associated with the user, the license comprising at least a license key configured to decrypt an access key corresponding to a segment of encrypted digital content; and
    a transfer component that transfers a sublicense comprising at least a portion of the user's license to another person.

54. The system of claim 53,
    wherein the transfer component receives a request from a user to transfer at least a portion of the user's license to another person.

55. The system of claim 53, wherein the license is valid for a set number of viewings, further comprising:
    a license determination component that determines that the set number of viewings has not been exhausted prior to the license being sent.

56. The system of claim 53, wherein the license is valid for a period of time, further comprising:
    a license determination component that determines that the valid time period has not expired prior to the license being sent.

57. The system of claim 53, further comprising:
    a concurrent use determination component that determines whether a different entertainment device currently has a license to view the digital content, wherein the license is only sent if a different entertainment device does not currently have the license to view the digital content.

58. The system of claim 53, wherein the verification component receives user identity credentials read from a smart card in communication with an entertainment device and verifies the user identity credentials.

59. The system of claim 53, wherein the search component searches the plurality of licenses for a license corresponding to the user and in response to locating a license associating the user with the requested digital content, the license comprising a license key configured to decrypt an access key corresponding to a segment of the digital content is located.

60. The system of claim 53, wherein the transmission component sends the license via a persistent network connection.

61. The system of claim 53, wherein the encrypted access key comprises an encrypted access key stream corresponding to a plurality of segments of encrypted digital content.

62. The system of claim 53, wherein the segment of encrypted digital content comprises an encrypted digital content stream from the content source.

63. The system of claim 53, wherein the license comprises a license to view the digital content a set number of times, and wherein the sublicense allows the other person to view the digital content at least a subset of the set number of times.

64. The system of claim 53, wherein the license comprises a license to create a set number of sublicenses based on the license, and wherein the sublicense allows the other person to create at least a subset of the set number of sublicenses based on the license.

65. The system of claim 53, wherein the license comprises a license to create a set number of generations of sublicenses based on the license, and wherein the sublicense allows the other person to create at least a subset of the set number of generations of sublicenses based on the license.

66. The system of claim 53, wherein the license is disabled for a set period of time corresponding to an established time interval of a sublicense created from the license.

67. The system of claim 53, wherein the license comprises a license to view the digital content during an established time interval, and wherein the sublicense allows the other person view the digital content during at least a subset of the time interval.

68. A computer-implemented method for providing conditional access to digital content, the method comprising:
    accessing a verification entity via a persistent network connection;
    establishing a user's identity with the verification entity;
    receiving a license from the verification entity in response to the verification entity having stored a license for the user to view the digital content, wherein the license comprises an expiration time;
    receiving an encrypted access key from an access key source corresponding to a segment of encrypted digital content;
    decrypting the encrypted access key using the license;
    receiving the segment of encrypted digital content from a content source;
    decrypting the segment of encrypted digital content using the decrypted access key;
    outputting the decrypted segment of digital content to an output device;
    storing the license in volatile memory of the entertainment device;
    disconnecting from the persistent network connection; and in response to the expiration time being passed, deleting the stored license key from the volatile memory.

69. A computer-implemented method for providing conditional access to digital content, the method comprising:

accessing a verification entity via a persistent network connection;

establishing a user's identity with the verification entity;

receiving a license from the verification entity in response to the verification entity having stored a license for the user to view the digital content, wherein the license comprises an expiration time;

receiving an encrypted access key from an access key source corresponding to a segment of encrypted digital content;

decrypting the encrypted access key using the license;

receiving the segment of encrypted digital content from a content source;

decrypting the segment of encrypted digital content using the decrypted access key;

outputting the decrypted segment of digital content to an output device;

storing the license in volatile memory of the entertainment device;

disconnecting from the persistent network connection; and in response to the expiration time being passed, blocking access to the stored license key.

70. A system for providing conditional access to digital content, the system comprising:

a network interface that accesses a verification entity via a persistent network connection;

an identification component that establishes a user's identity with the verification entity;

a license reception component that receives a license from the verification entity in response to the verification entity having stored a license for the user to view the digital content;

an access key reception component that receives an encrypted access key from an access key source corresponding to a segment of encrypted digital content;

an access key decryption component that decrypts the encrypted access key using a license key associated with the license;

an encrypted digital content reception component that receives the segment of encrypted digital content from a content source;

an encrypted digital content decryption component that decrypts the segment of encrypted digital content using the decrypted access key; and an output component that outputs the decrypted segment of digital content to a output device;

wherein the license comprises an expiration time, wherein the license reception component stores the license in volatile memory, wherein the network interface disconnects from the persistent network connection, and wherein the license reception component deletes the stored license in response to the expiration time being passed.

71. A system for providing conditional access to digital content, the system comprising:

a network interface that accesses a verification entity via a persistent network connection;

an identification component that establishes a user's identity with the verification entity;

a license reception component that receives a license from the verification entity in response to the verification entity having stored a license for the user to view the digital content;

an access key reception component that receives an encrypted access key from an access key source corresponding to a segment of encrypted digital content;

an access key decryption component that decrypts the encrypted access key using a license key associated with the license;

an encrypted digital content reception component that receives the segment of encrypted digital content from a content source;

an encrypted digital content decryption component that decrypts the segment of encrypted digital content using the decrypted access key; and an output component that outputs the decrypted segment of digital content to a output device;

wherein the license comprises an expiration time, wherein the license reception component stores the license in volatile memory, and wherein the network interface disconnects from the persistent network connection, and wherein the license reception component blocks access to the stored license in response to the expiration time being passed.

72. A system for providing conditional access to digital content, the system comprising:

a storage device that stores a plurality of licenses to view specific digital content, each license being associated with a particular user;

a request reception component that receives a request from a user of an entertainment device to view specific digital content;

a verification component that verifies the user's identity from information within the request;

a search component that locates a license for the user to view the digital content, wherein the license is valid for a period of time; and a transmission component that sends the license associated with the user, the license comprising at least a license key configured to decrypt an access key corresponding to a segment of encrypted digital content;

wherein the verification component is further to determine whether the license is temporarily revoked for a set period of time to enable a sublicense.

73. A system for providing conditional access to digital content, the system comprising:

a network interface that accesses a verification entity via a temporary network connection;

an identification component that establishes a user's identity with the verification entity;

a license reception component that receives a license from the verification entity in response to the verification entity having stored a license for the user to view the digital content;

a volatile memory that temporarily stores the license;

an access key reception component that receives an encrypted access key from an access key source corresponding to a segment of encrypted digital content;

an access key decryption component that decrypts the encrypted access key using a stored license key associated with the license, the license key comprising an expiration time;

an encrypted digital content reception component that receives the segment of encrypted digital content from a content source;

an encrypted digital content decryption component that decrypts the segment of encrypted digital content using the decrypted access key;

an output component that outputs the decrypted segment of digital content to a output device; and a license deletion component that, in response to the expiration time being passed, deletes the stored license from the volatile memory.

74. A system for providing conditional access to digital content, the system comprising:

a network interface that accesses a verification entity via a temporary network connection;

an identification component that establishes a user's identity with the verification entity;

a license reception component that receives a license from the verification entity in response to the verification entity having stored a license for the user to view the digital content;

a volatile memory that temporarily stores the license;

an access key reception component that receives an encrypted access key from an access key source corresponding to a segment of encrypted digital content;

an access key decryption component that decrypts the encrypted access key using a stored license key associated with the license, the license key comprising an expiration time;

an encrypted digital content reception component that receives the segment or encrypted digital content from a content source;

an encrypted digital content decryption component that decrypts the segment of encrypted digital content using the decrypted access key;

an output component that outputs the decrypted segment of digital content to a output device; and a license deletion component that, in response to the expiration time being passed, blocks access to the stored license.

75. A computer-implemented method for providing conditional access to digital content, the method comprising:

storing a plurality of licenses to view specific digital content, each license being associated with a particular user of an entertainment device;

receiving a request from a user of a specific entertainment device to view specific digital content;

verifying the user's identity from information within the request;

locating a license for the user to view the digital content;

determining whether a different entertainment device currently has a license to view the digital content; and sending the license to the user in response to a different entertainment device not currently having a license to view the digital content, the license comprising at least a license key configured to decrypt an access key corresponding to a segment of encrypted digital content.

76. A system for providing conditional access to digital content, the system comprising:

a storage device that stores a plurality of licenses to view specific digital content, each license being associated with a particular user;

a request reception component that receives a request from a user of a specific entertainment device to view specific digital content;

a verification component that verifies the user's identity from information within the request;

a search component that locates a license for the user to view the digital content;

a concurrent use determination component that determines whether a different entertainment device currently has a license to view the digital content; and a transmission component that sends the license to the user in response to a different entertainment device not currently having a license to view the digital content, the license comprising at least a license key configured to decrypt an access key corresponding to a segment of encrypted digital content.

* * * * *

UNITED STATES PATENT AND TRADEMARK OFFICE
CERTIFICATE OF CORRECTION

PATENT NO. : 6,865,555 B2
APPLICATION NO. : 09/990098
DATED : March 8, 2005
INVENTOR(S) : Robert E. Novak It is certified that error appears in the above-identified patent and that said Letters Patent is hereby corrected as shown below:

Column 1, line 62, ". . . a one time or unlimited . . ." change to --a one-time or unlimited--

Column 2, line 56, ". . . the like, The verification . . ." change to --the like. The verification--

Column 5, line 58, ". . . a centrally-located facility. . ." change to --a centrally located facility--

Column 6, line 17, ". . . fiber optic cable . . ." change to --fiber-optic cable--

Column 6, line 32, ". . . system. Back-up videotape . . ." change to --system. Backup videotape--

Column 8, line 42, ". . . back channel transmission, which . . ." change to --back-channel transmission, which--

Column 9, line 9, ". . . audio/video (AV) controller . . ." change to --audio/video (A/V) controller--

Column 9, line 14, ". . . The AV controller . . ." change to --The A/V controller--

Column 10, line 27, ". . . as a back-up network . . ." change to --as a back up network--

Column 12, line 54, ". . . back-up copies. . ." change to --backup copies--

Column 13, line 15, ". . . as back-up connection . . ." change to --as backup connection--

Column 13, line 55, " . . . portions of licenses, sublicenses. . ." change to --portions of licenses, or sublicenses--

Column 13, line 67, ". . . in a hierarchy is. . ." change to --in a hierarchy are--

Column 14, line 64, ". . . underway)." change to --under way).--

Column 15, line 18, ". . . Of course while . . ." change to --Of course, while--

Column 15, line 34, ". . . first user 406$a$ then . . ." change to --first user 402$a$--

UNITED STATES PATENT AND TRADEMARK OFFICE
CERTIFICATE OF CORRECTION

PATENT NO. : 6,865,555 B2
APPLICATION NO. : 09/990098
DATED : March 8, 2005
INVENTOR(S) : Robert E. Novak It is certified that error appears in the above-identified patent and that said Letters Patent is hereby corrected as shown below:

Column 18, line 34, ". . . shown a flowchart of . . ." change to --shown a flow chart of--

Column 21, line 59, ". . . time interval and wherein . . ." change to --time interval, and wherein--

Column 22, line 37, ". . . other person view the . . ." change to --other person to view the--

Column 24, line 41, ". . . person view the . . ." change to --person to view the--

Column 25, line 54, ". . . to a output device;" change to --to an output device;--

Column 26, line 18, ". . . to a output device;" change to --to an output device;--

Column 27, line 5, ". . . to a output device; . . ." change to --to an output device;--

Column 27, line 30, ". . . the segment of encrypted digital . . ." change to --the segment of encrypted--

Column 27, line 36, ". . . to a output device; . . ." change to --to an output device:--

Signed and Sealed this

Twentieth Day of February, 2007

JON W. DUDAS
*Director of the United States Patent and Trademark Office*